US011733856B2

(12) United States Patent
Storr et al.

(10) Patent No.: US 11,733,856 B2
(45) Date of Patent: *Aug. 22, 2023

(54) GRAPHICAL USER INTERFACE SYSTEM

(71) Applicant: Palantir Technologies Inc., Denver, CO (US)

(72) Inventors: Adam Storr, Palo Alto, CA (US); Aditya Dahiya, Brooklyn, NY (US); Andrew Elder, New York, NY (US); Daniel Cervelli, Mountain View, CA (US); Joseph Rafidi, Mountain View, CA (US); Matthew Bango, Redwood City, CA (US); Parvathy Menon, San Jose, CA (US); Roger Chen, Menlo Park, CA (US); Timothy Slatcher, Menlo Park, CA (US); Walker Burgin, Seattle, WA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/099,548

(22) Filed: Nov. 16, 2020

(65) Prior Publication Data

US 2021/0089181 A1 Mar. 25, 2021

Related U.S. Application Data

(63) Continuation of application No. 16/246,370, filed on Jan. 11, 2019, now Pat. No. 10,838,614.

(Continued)

(51) Int. Cl.
*G06F 3/048* (2013.01)
*G06F 3/0486* (2013.01)
(Continued)

(52) U.S. Cl.
CPC ............ *G06F 3/0486* (2013.01); *G06F 3/048* (2013.01); *G06F 3/0481* (2013.01); *G06F 9/451* (2018.02); *G06F 2203/04803* (2013.01)

(58) Field of Classification Search
None
See application file for complete search history.

(56) References Cited

U.S. PATENT DOCUMENTS 10,838,614 B2  11/2020  Storr et al.
2006/0064674 A1 * 3/2006  Olson ...................... G06F 8/34
                                                                  717/113

(Continued)

*Primary Examiner* — Xuyang Xia
(74) *Attorney, Agent, or Firm* — Knobbe, Martens, Olson & Bear, LLP

(57) ABSTRACT

Systems and methods are provided for improved graphical user interfaces. The system enables multiple separate applications, each of which may typically be in their own separate window or tab, to be interacted within a single window, such as a tab of a web browser application. The main window includes smaller sub-windows that can correspond to a distinct application with its own graphical user interface. A large sub-window within the main window is opened for the primary application where the user is currently interacting with a graphical user interface of the primary application. The user then is able to switch between applications (all within the same main window) and applications that are no longer being used can be minimized in smaller sub-windows off to the side of the primary sub-window. The system enables a user to drag and drop an item from one sub-window to another sub-window. Some of the interactions between the windows and data transformations are stored and can be visually presented in a graph.

20 Claims, 14 Drawing Sheets

Related U.S. Application Data

(60) Provisional application No. 62/652,212, filed on Apr. 3, 2018.

(51) Int. Cl.
  *G06F 3/0481* (2022.01)
  *G06F 9/451* (2018.01)

(56) References Cited

U.S. PATENT DOCUMENTS

| | | | |
|---|---|---|---|
| 2009/0234811 A1* | 9/2009 | Jamil | G06F 16/9535 |
| 2011/0055132 A1* | 3/2011 | Mahdian | G06Q 10/00 |
| | | | 706/46 |
| 2014/0089818 A1* | 3/2014 | Andler | G06F 3/04842 |
| | | | 715/753 |
| 2014/0089831 A1* | 3/2014 | Kim | G06F 3/04883 |
| | | | 715/769 |
| 2015/0193549 A1* | 7/2015 | Frye | G06F 3/0482 |
| | | | 715/739 |
| 2015/0227278 A1* | 8/2015 | Bruce | G06F 3/0482 |
| | | | 715/761 |
| 2015/0372877 A1* | 12/2015 | Tompkins | H04L 41/5009 |
| | | | 715/736 |
| 2018/0335914 A1* | 11/2018 | Nilo | G06F 3/0412 |
| 2018/0348979 A1* | 12/2018 | Hansbrough | H04W 4/60 |

* cited by examiner

FIG. 10

GRAPHICAL USER INTERFACE SYSTEM

INCORPORATION BY REFERENCE TO ANY PRIORITY APPLICATIONS

This application is a continuation of U.S. patent application Ser. No. 16/246,370 entitled "Graphical User Interface Systems" filed Jan. 11, 2019, which application claims benefit of U.S. Provisional Patent Application Ser. No. 62/652,212 entitled "Graphical User Interface System" filed Apr. 3, 2018, which are hereby incorporated by reference in their entireties.

Any and all applications for which a foreign or domestic priority claim is identified in the Application Data Sheet as filed with the present application are hereby incorporated by reference under 37 CFR 1.57.

BACKGROUND

In the area of computer-based platforms, discrete applications typically offer minimal user interactivity between the applications. In a web browser application, different web applications can be opened in separate tabs; however, the different web applications in the separate tabs may have little or no user interaction capabilities between them. In a user operating system context, a user can open discrete applications in separate windows; however, yet again, the discrete applications in separate windows may have little or no user interaction capabilities between them.

SUMMARY

The systems, methods, and devices described herein each have several aspects, no single one of which is solely responsible for its desirable attributes. Without limiting the scope of this disclosure, several non-limiting features will now be discussed briefly.

According to an embodiment, a method for a graphical user interface is disclosed comprising: causing presentation of a first application in a first window and a second application in a second window, wherein presentation of the first application in the first window is larger than the second application in the second window; receiving a drag event message comprising a payload from the first application in the first window, the payload comprising a data type and a first resource identifier; transmitting the drag event message to the second application that causes the second application in the second window to present an updated user interface indication in the second window based at least in part on the data type; receiving a drop event message comprising: (i) a source indication identifying the first application in the first window, (ii) a destination indication identifying the second application in the second window, and (iii) the first resource identifier; in response to receiving the drop event message, transmitting an update message to the second application that causes the second application in the second window to retrieve first data indicated by the first resource identifier; and causing an updated presentation of the second application in the second window as larger than the first application in the first window based at least in part on the source indication and the destination indication of the drop event message.

According to an aspect, the method may further comprise: storing a record of a drag and drop interaction for the first resource identifier between the first application in the first window and the second application in the second window; and causing presentation of a new layout of the first window and the second window, wherein causing presentation of the new layout further comprises: determining, from the record of the drag and drop interaction, a relation between the first application and the second application that the first application provided input to the second application; determining a first position of the first application in the first window and a second position of the second application in the second window according to the relation; and causing presentation of the first window at the first position and the second window at the second position.

According to another aspect, causing presentation of the new layout may further comprise: scaling the second window from a first size to a second size.

According to yet another aspect, the method may further comprise: generating a graph, wherein generating the graph comprises: determining, from the record of the drag and drop interaction, a first node for the first application and a second node for the second application; and connecting the first node to the second node according to the record of the drag and drop interaction that indicates a connection between the first application and the second application; and causing presentation of the graph.

According to yet another aspect, the payload may further comprise metadata regarding the first data, and the method may further comprise: determining a description of the first data from the metadata; and causing presentation of a user interface element for a drag user interaction, the user interface element comprising the description that previews the first data.

According to yet another aspect, the drag event message may comprise an HTTP POST message.

According to yet another aspect, the first window may comprise a first iframe and the second window may comprise a second iframe.

According to another embodiment, a system is disclosed comprising: a non-transitory computer storage medium configured to at least store computer-executable instructions; and one or more computer hardware processors in communication with the non-transitory computer storage medium, the one or more computer hardware processors configured to execute the computer-executable instructions to at least: cause presentation of a first application in a first window and a second application in a second window, wherein presentation of the first application in the first window is larger than the second application in the second window; transmit the drag event message to the second application that causes the second application in the second window to present an updated user interface indication in the second window based at least in part on the data type; receive a drop event message comprising: (i) a source indication identifying the first application in the first window, (ii) a destination indication identifying the second application in the second window, and (iii) the first resource identifier; and in response to receiving the drop event message, cause an updated presentation of the second application in the second window as larger than the first application in the first window based at least in part on the source indication and the destination indication of the drop event message.

According to an aspect, the one or more computer hardware processors may be further configured to: store a record of a drag and drop interaction for the first resource identifier between the first application in the first window and the second application in the second window.

According to another aspect, the one or more computer hardware processors may be further configured to: cause presentation of a new layout of the first window and the second window, wherein causing presentation of the new layout further comprises: determining, from the record of the drag and drop interaction, a relation between the first application and the second application that the first application provided input to the second application; determining a first position of the first application in the first window and a second position of the second application in the second window according to the relation; and causing presentation of the first window at the first position and the second window at the second position.

According to yet another aspect, causing presentation of the new layout may further comprise: scaling the second window from a first size to a second size.

According to yet another aspect, the one or more computer hardware processors may be further configured to: generate a graph, wherein generating the graph comprises: determining, from the record of the drag and drop interaction, a first node for the first application and a second node for the second application; and connecting the first node to the second node according to the record of the drag and drop interaction that indicates a connection between the first application and the second application; and cause presentation of the graph.

According to yet another aspect, the payload may further comprise metadata regarding the first data, and the one or more computer hardware processors may be further configured to: determine a description of the first data from the metadata; and cause presentation of a user interface element for a drag user interaction, the user interface element comprising the description that previews the first data.

According to yet another aspect, determining the description may further comprise: generating the description that includes a summary of the first data, the description comprising a textual description.

According to yet another aspect, presentation of the first application in the first window and the second application in the second window may occur in a browser application.

According to yet another aspect, the first application and the second application may be hosted on separate domains.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of multiple applications and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 10 illustrates an orientation graphical user interface of a graphical user interface system, according to some embodiments of the present disclosure.

DETAILED DESCRIPTION

Overview

Figure 1:
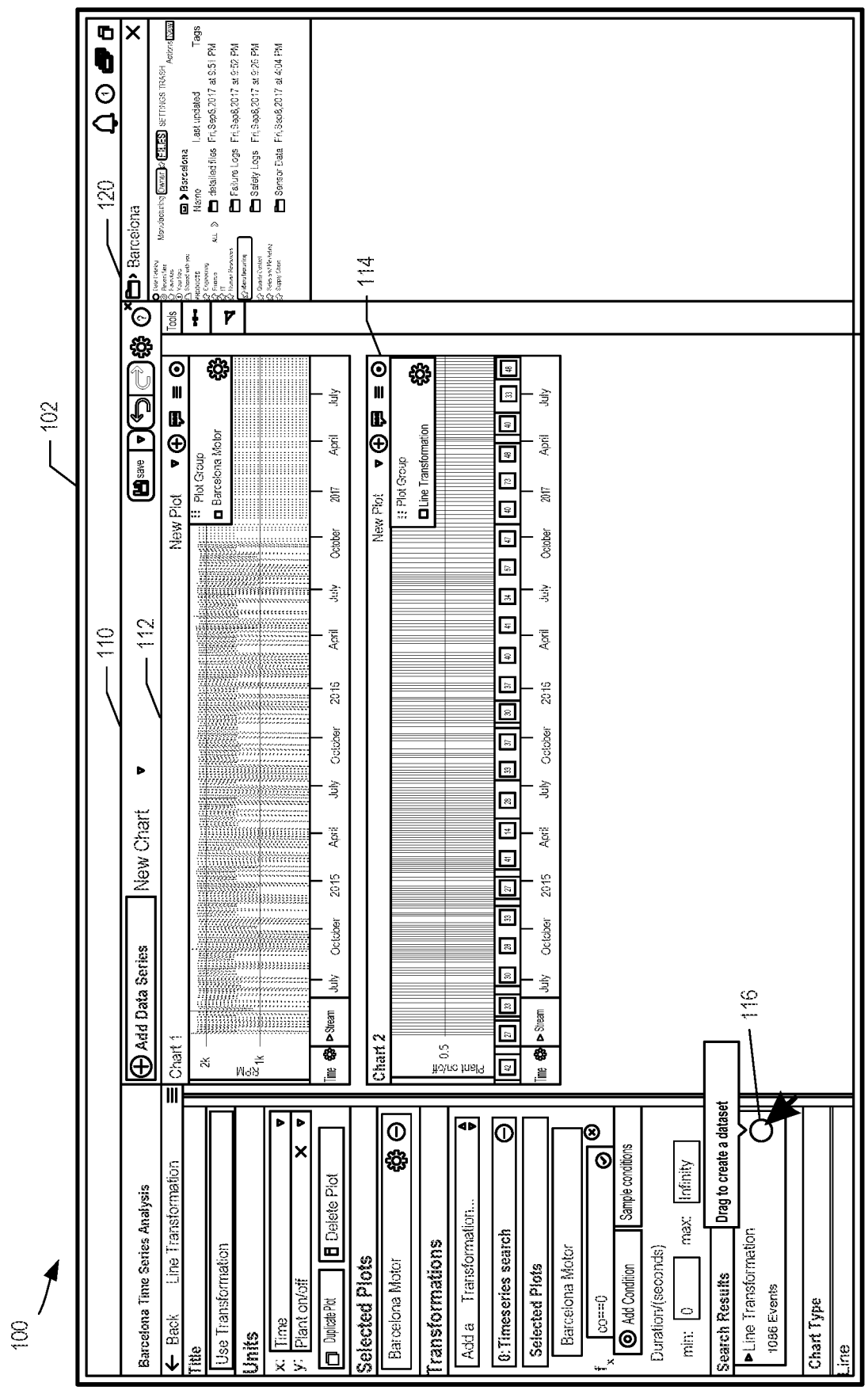
FIG. 1 illustrates a graphical user interface of a graphical user interface system, according to some embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

In a computing context, a user can interact with multiple discrete applications. In an operating system, a user can interact with multiple applications with each application being in a separate window. In a web browser, a user can interact with multiple web applications with each web application being in a separate tab. The user interactions with a particular application are typically isolated to that particular application. Moreover, in a context with multiple discrete applications that operate on the same underlying data, a user may be interested in the following questions: Where did the data come from? Is the data good? Can I trust the data? How has the data been transformed and/or interacted with via the various applications? Further, there may not be a consistent method for transitioning between the various applications while operating on the same underlying data.

Disclosed herein are systems and methods that may be used to advantageously provide a cohesive graphical user interface experience. A graphical user interface system can enable multiple separate applications, each of which may typically be in their own separate window or tab, to be interacted within a single window, such as a tab of a web browser application. The main window can include smaller sub-windows that each can correspond to a distinct application with its own graphical user interface. A large sub-window within the main window can be opened for the primary application where the user is currently interacting with a graphical user interface of the primary application. The user can switch between applications (all within the same main window) and applications that are no longer being used can be minimized in smaller sub-windows off to the side of the primary sub-window. Some of the interactions between the windows and data transformations can be stored and can be visually presented in a graph.

A user can drag an icon representing data, an item, or resource from the primary sub-window to one of the minimized secondary sub-windows. The secondary sub-windows can show updated user interfaces when a drag user interaction is detected, such as showing a highlighted box in the secondary sub-windows where the data, item, or resource can be dropped. The primary and secondary sub-windows can update in response to a drag-and-drop user interaction. For example, where the main window includes graphical user interfaces for a time series application in a primary sub-window and a reporting application in a secondary sub-window, and there is a drag-and-drop user interaction from the time series application to the reporting application, then the time series application can change from a primary to a secondary sub-window and the reporting application in the secondary sub-window can become the primary, and vice versa.

In some embodiments, the graphical user interface can operate in a single tab of a web browser application and each of the sub-windows within the graphical user interface can be implemented using an iframe, and each application sub-window can be a separate application running (instead of separate tabs for each application). The graphical user interface system can use a messaging bus to enable the separate applications in sub-windows to communicate with one another. The messaging bus can use a POST messaging format. The iframe and/or messaging solutions that are a part of the graphical user interface system can provide security benefits since the sub-window applications can be hosted separately (such as on a third-party domain) and the inter-application communication is required to occur through the secure messaging bus system.

As mentioned above, existing graphical user interface systems that support multiple applications can provide a fragmented user experience. In an operating system, a user can open different applications in separate windows; however, the applications in separate windows may have little or no user interaction capabilities between them and provides a fragmented experience. Similarly, in a web browser, different web applications can be opened in separate tabs and the user ends up with a fragmented experience. A user can switch between the applications, but any relation between the applications and/or user interaction among two or more the applications is typically unavailable.

Drag and drop may be a useful user interaction. Some existing graphical user interface systems can include drag and drop functionality. Drag and drop can be implemented in HTML using draggable attributes, events, and events handlers. Some graphical user interface libraries provide drag and drop functionality. However, existing drag-and-drop functionality may lack some aspects of the improved drag and drop functionality described herein. For example, existing drag and drop in HTML may not be compatible with cross-domain iframes. Other improved drag and drop features include showing an indicator of where an item can be dropped and/or showing additional graphics or text associated with an item being dragged, such as a preview of the data being dragged.

In a system with multiple discrete applications that operate on the same underlying data, a user may switch between applications to perform various operations on the underlying data such as transforming the data, enhancing the data, analyzing the data, generating user interfaces to present the data, generating reports on the data, and/or some combination thereof. However, some existing graphical user interface systems may be unable to provide a user a history of the data and/or a history of user interactions with the data, such as where the data came from and how as the data been transformed and/or touched by a user.

Accordingly, the systems and techniques described herein may improve computer technology, the cohesiveness of discrete applications, and/or the user interaction capabilities between discrete applications. For example, a graphical user interface system can enable multiple separate applications to be interacted within a single window or fewer windows or tabs than other systems. Some of the discrete applications can be external applications, such as partially or wholly hosted by a third party. The graphical user interface system can provide a cohesive experience such that a user can switch between applications in the same window, drag and drop data between applications, and/or view the history of user interactions with the various user interfaces. A user can view the data flow between applications. The systems and techniques described herein can enable users to access data faster, perform analyses faster, and/or interact with one or more user interfaces faster than existing graphical user interface systems (such as by reducing the number of clicks or selections by a user). Thus, the systems and techniques described herein can improve over conventional user interfaces.

In some embodiments, each application sub-window can be implemented with an external frame technology, such as iframes. An iframe (short for inline frame) is an HTML element that allows an external webpage or application to be embedded in an HTML document. The graphical user interface system can use a messaging bus to enable the separate applications in sub-windows to communicate with one another, such as messages related to drag and drop functionality that enables drag and drop between the sub-windows, which can be in iframes. The messaging bus can use a POST messaging format. The external frame and/or messaging solutions that are a part of the graphical user interface system can provide security benefits since the sub-window applications can be hosted separately (such as on a third-party domain) and the inter-application communication can be required to occur through the secure messaging bus system. Thus, the systems and techniques described herein can improve computer technology and/or may be inherently tied to computer technology.

In some embodiments, the graphical user interface system can store a history of the user interactions with the sub-window applications. Thus, the system can provide in an improved graphical user interface that presents the history of the user interactions in a graph view. Additionally or alternatively, the graphical user interface system can present a graphical view of the sub-window applications in an logical layout that can represent, for example, a main sub-window application and secondary sub-window applications that interacted with the underlying data before getting to the main sub-window application as well as sub-window applications that may be less related (or not related) to the operation of the main sub-window application. Thus, the systems and techniques described herein can improve over conventional user interfaces by providing a historical view of user interactions with applications and/or data.

Example Graphical User Interfaces

FIGS. 1, 2, 3, 4, 5, 6, 7, 8, 9, 10, 11, and 12 illustrate example user interfaces of a graphical user interface system, according to some embodiments of the present disclosure. In particular, FIGS. 1, 2, 3, 4, 5, 6, 7, 8, 9, 10, 11, and 12 illustrate example user interfaces of the graphical user interface system 1300 described below with respect to FIG.

13. In various embodiments, aspects of the user interfaces may be rearranged from what is shown and described below, and/or particular aspects may or may not be included. However, the embodiments described below in reference to FIGS. 1, 2, 3, 4, 5, 6, 7, 8, 9, 10, 11, and 12 provide example user interfaces of a graphical user interface system. The user interfaces of FIGS. 1, 2, 3, 4, 5, 6, 7, 8, 9, and/or 10 such as, the user interfaces 100, 200, 300, 400, 500, 600, 700, 800, 900, and/or 1000 may have similar user interface elements and/or capabilities. The user interfaces of FIGS. 11 and 12 such as, the user interfaces 1100 and 1200 may have similar user interface elements and/or capabilities.

FIGS. 1-8 and 10-12 can illustrate example user interfaces of a graphical user interface system in an example manufacturing context. FIGS. 1-8 and 10-12 can relate to an investigation of the shutdowns of one or more manufacturing plants. In the example, an analyst wants to determine when a plant was shut down and/or potential causes of shutdowns. However, the analyst may not have direct shutdown data. Thus, the analyst can begin by analyzing time series data for the output of a motor in the plant to determine whether and when shutdowns occurred.

FIG. 1 illustrates a graphical user interface 100 of a graphical user interface system, according to some embodiments of the present disclosure. The main window 102 includes a first window 110 and a second window 120. In FIG. 1, the first window 110 is the primary window and is larger than the second window 120, which is a secondary window. The example first application in the first window 110 is a time series analysis application. The example second application in the second window 120 is a document repository application. The first application and the second application each have their own respective graphical user interfaces. As described herein, each of the first application and the second application can operate independently; however, the graphical user interface system enables the first application and the second application to exist and be operable within the same window 102.

The example time series application in the first window 110 can load time series data. In the manufacturing example, a time series for a motor in the plant can be loaded in the first chart 112. In the first chart 112, where the time series value drops to zero, then a shutdown occurred. The analyst, using the time series application, extracts all of the periods of time from the time series where the time series drops to zero so the analyst can use the generated data set about when the shutdowns occurred to determine a potential cause of the shutdowns. The analyst performs a line transformation on the time series for when a time series value equals zero to generate the second chart 114. As shown, the output of the line transformation is the determined 1,086 shutdown events.

The first window 110 includes a selectable user interface element 116. The user interface element 116 is selectable by a user to interact with a representation of a data set, such as the creation of a data set from the analysis. The analyst can drag the element 116 to another window to allow another application to interact with the generated data set, which here corresponds to the determined event data for plant shutdowns. In some embodiments, an advantage of using an external frame technology is that if there are updates in the application of the second window 120, such as updates by different users or teammates, then the minimized graphical user interface of the second window 120 may update in a miniaturized manner. For example, if other users are adding new files to the folder location in the document repository shown in the second application in the second window 120, then a user can see those updates in the miniaturized view in some embodiments.

In some embodiments, presentation of the main window 102, the first application in the first window 110, and the second application in the second window 120 occurs in a browser application. In a web application context, the first application and the second application can be hosted on separate domains. In a web context, the main window 102 can be the parent window and the first window 110 and the second window 120 can be children of the parent window, such as the children in a Document Object Model of a markup language (such as HTML). Moreover, the first window 110 and the second window 120 can include external frames, such as an iframe, that enables the respective applications, which can be hosted separately from the application of the main window 102, to be embedded in the main window 102.

Figure 2:
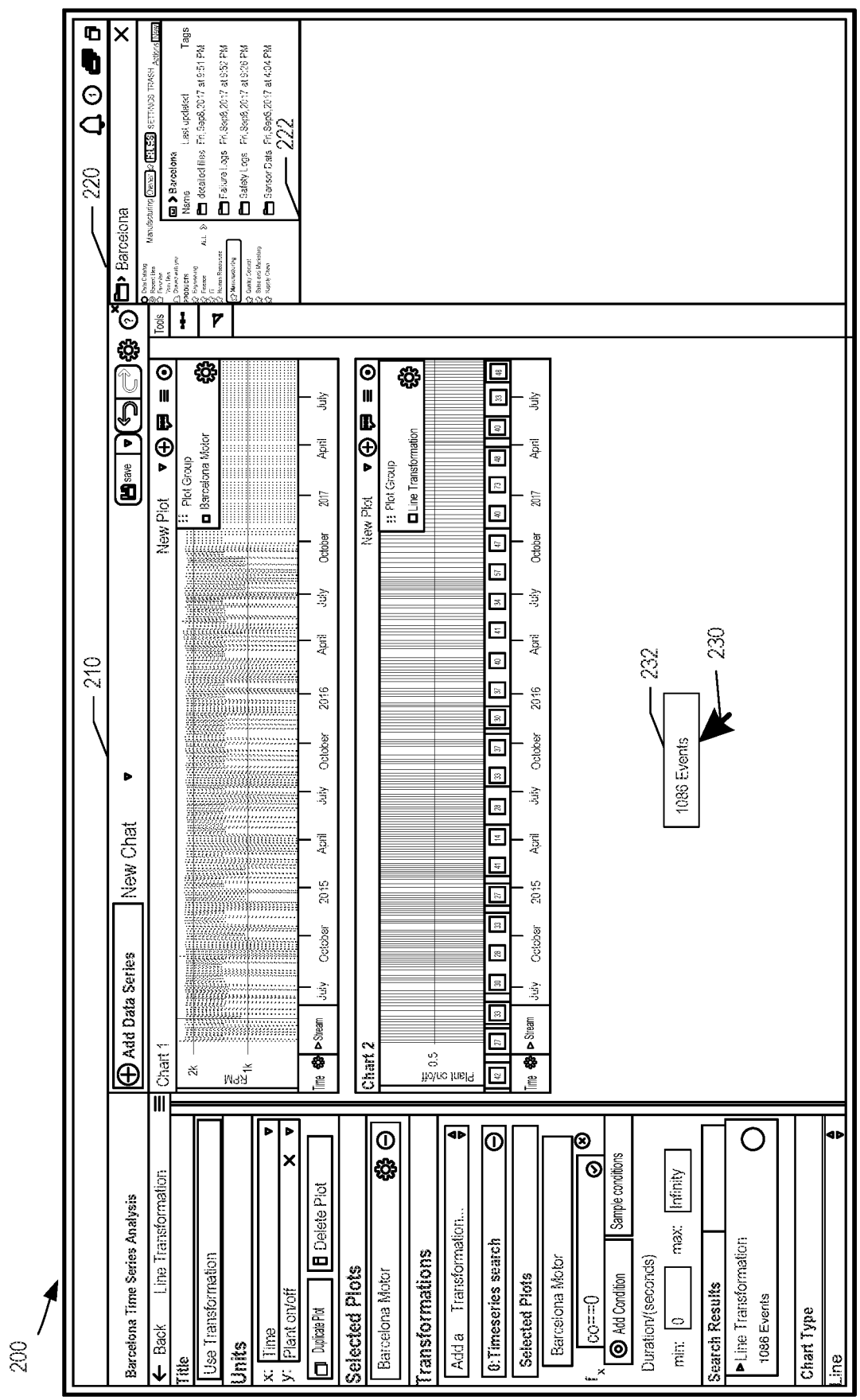
FIG. 2 illustrates a user interaction in a graphical user interface of a graphical user interface system, according to some embodiments of the present disclosure.

FIG. 2 illustrates a user interaction 230 in a graphical user interface 200 of a graphical user interface system, according to some embodiments of the present disclosure. FIG. 2 can illustrate a continuation of the example(s) of FIG. 1. The graphical user interface 200 can be similar to the graphical user interface 100 of FIG. 1. In FIG. 2, the user interaction 230 can be a user selection of the data set representation 232. In particular, the user interaction 230 can be a drag user interaction. In response to the start of the user interaction 230, a user interface indication 222 can be shown in the second application in the second window 220.

In some embodiments, in response to the start of the user interaction 230, the system for the main window 202 (or a primary window such as the window 210) can control the applications in the sub-window. For example, in a web context, some browser applications may have security precautions in place that disallow drag and drop in various context, such as where a user drags an item over an iframe some browser applications prevent the iframe from seeing that event from within the iframe. Thus, when a drag event is detected (or some other user interaction), the system for the main window 202 (or a primary window such as the window 210) can place a screen or overlay on top of one or more other sub-windows and/or can begin doing various interactions for those sub-windows including presenting user indication elements in the sub-windows and detecting a drop event. The various interactions for the sub-windows can be achieved through transmitting messages from the controlling system to the applications of the sub-windows, such via a messaging bus.

As described herein, the start of the user interaction 230 can cause the first application of the first window 210 to transmit a message on a messaging bus, which can be relayed to other applications, such as the second application in the second window 220. The message can include a payload where the payload includes a data type for the data set and a resource identifier for the data set. Thus, a system or application receiving the message can process the received message including the data type for the data set and determine that the data set is compatible with the second application, such as being able to receive the data set from the drop user interaction. Accordingly, the second application in the second window 220 can cause the user interface indication 222 to be shown in the second application in the second window 220. As shown, an example user interface indication 222 is an indicated area, such as a visual box element or a highlighted area, which indicates to a user that the user selected item can be received within the area and/or the application of the window. For example, the user interface indication 222 of the second window 220 can indicate that the data set correspond to the data set representation 232 can be passed to the document repository application of the second window 220.

Figure 3:
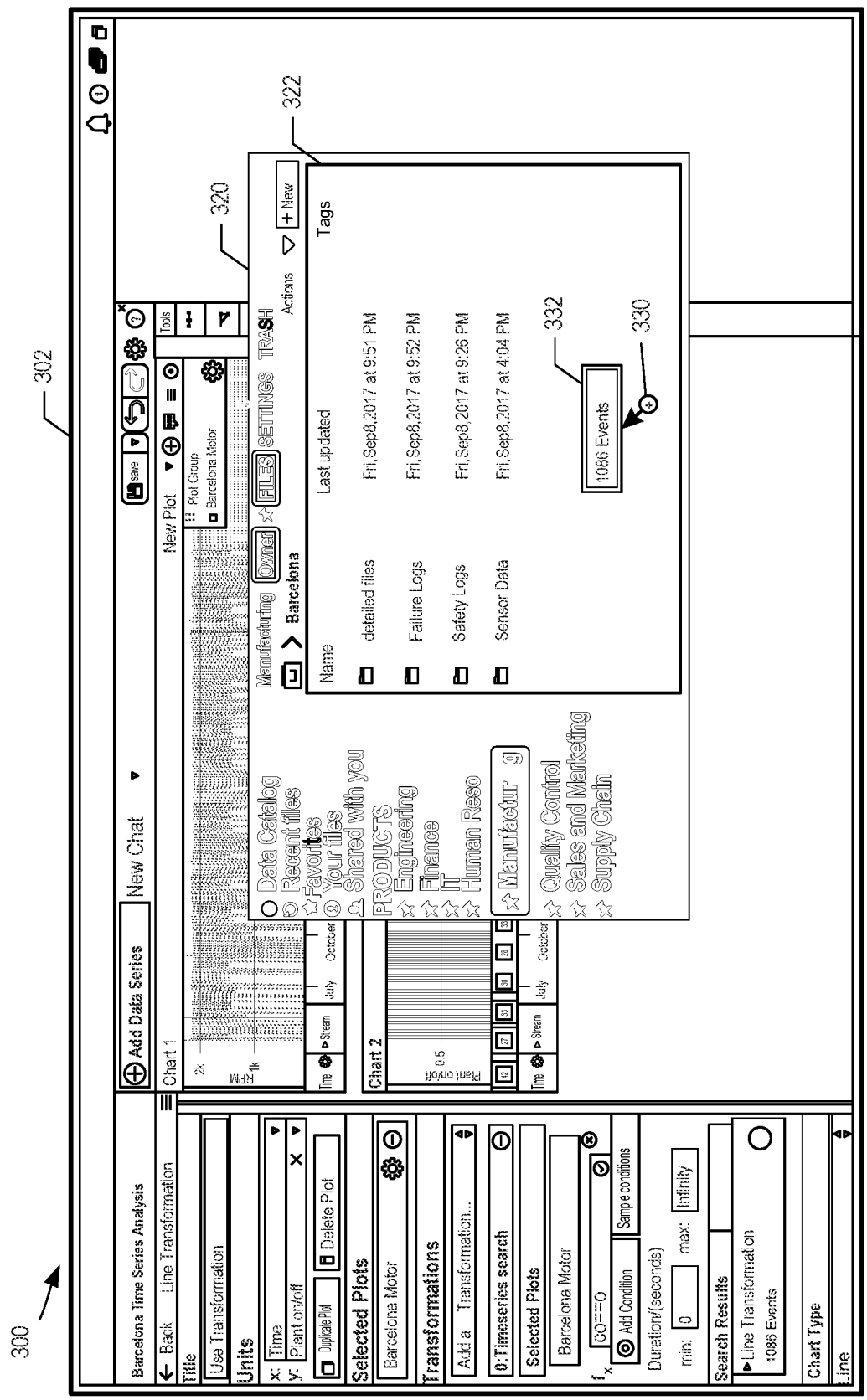
FIG. 3 illustrates a further user interaction in a graphical user interface of a graphical user interface system, according to some embodiments of the present disclosure.

FIG. 3 illustrates a user interaction 330 in a graphical user interface 300 of a graphical user interface system, according to some embodiments of the present disclosure. FIG. 3 can illustrate a continuation of the example(s) of FIGS. 1-2. The graphical user interface 300 can be similar to the graphical user interface(s) FIGS. 1 and/or 2. In FIG. 3, similar to the user interaction 230 of FIG. 2, the user interaction 330, such as a drag interaction, can be a user selection of the data set representation 332. As shown, the drag interaction 330 can intersect the user interface indication area 322 that can cause the second window 320 to update. As described herein, an event message can be transmitted upon detection of an intersection interaction. In response to the drag interaction 330 intersecting the user interface indication area 322 or the second window 320, the second window 320 can update. As shown, the second window 320 of FIG. 3 can be larger than the second window 220 of FIG. 2. Accordingly, a user can interact between two applications within the same window 302.

Figure 4:
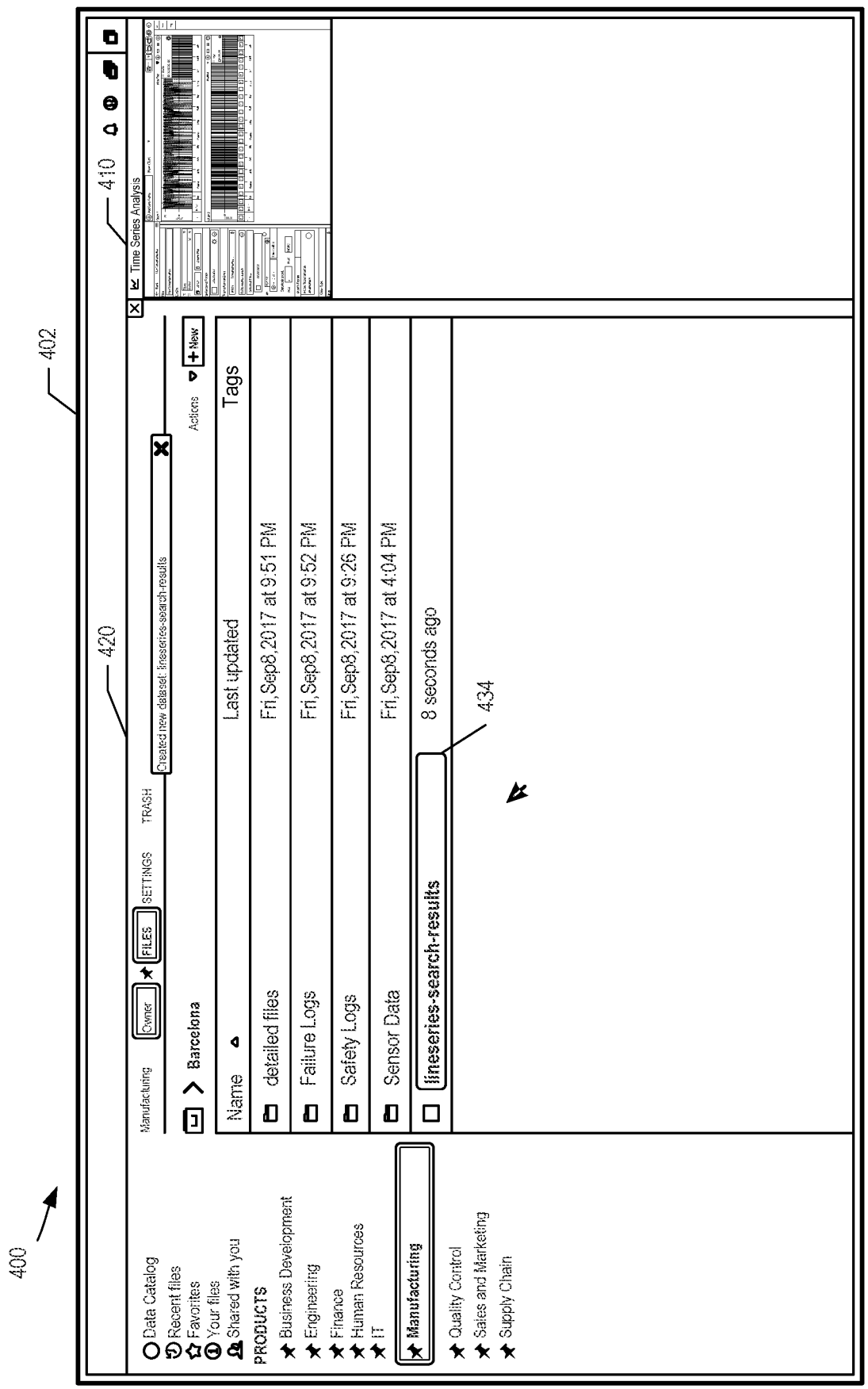
FIG. 4 illustrates an updated graphical user interface of a graphical user interface system, according to some embodiments of the present disclosure.

FIG. 4 illustrates an updated graphical user interface 400 of a graphical user interface system, according to some embodiments of the present disclosure. FIG. 4 can illustrate a continuation of the example(s) of FIGS. 1-3. The graphical user interface 400 can be similar to the graphical user interface(s) of FIGS. 1-3. The main window 402 includes a first window 410 and a second window 420. The main window 402 of FIG. 4 can be similar to the main window 102 of FIG. 1; the first window 410 of FIG. 4 can be similar to the first window 110 of FIG. 1; and the second window 420 of FIG. 4 can be similar to the second window 120 of FIG. 1. However, in response to the user interaction(s) of the previous FIG. 2 or 3, the updated graphical user interface 400 can present the second application in the second window 420 as larger than the first application in the first window 410, which can be the reverse of the respective sizes of the second window 120 and the first window 110 of FIG. 1.

As shown in FIG. 4, the analyst can save the analysis from the previous application as a new data set in the application of window 420. In particular, the analyst can name the new data set using the input element 434 of the document repository application of the second window 420. In the example, the analyst is creating a new data set by saving the results of the time series data, such as the time series transformation data, from the time series application in the first window 110 of FIG. 1. This new data set can correspond to the data set representation 232, 332 of FIGS. 2 and 3 that was dragged by the analyst into the second application in the second window 420. The analyst can name the new data set "Barcelona Plant Shutdowns" (not illustrated) using the input element 434.

As described herein, the graphical user interface 400 can update in response to a drop event message. As an example, an application or system can transmit a drop event message when a drop user interaction is detected. The drop event message can include a source indication identifying the first application in the first window 410, a destination indication identifying the second application in the second window 420, and/or a resource identifier corresponding to the data set.

Figure 5:
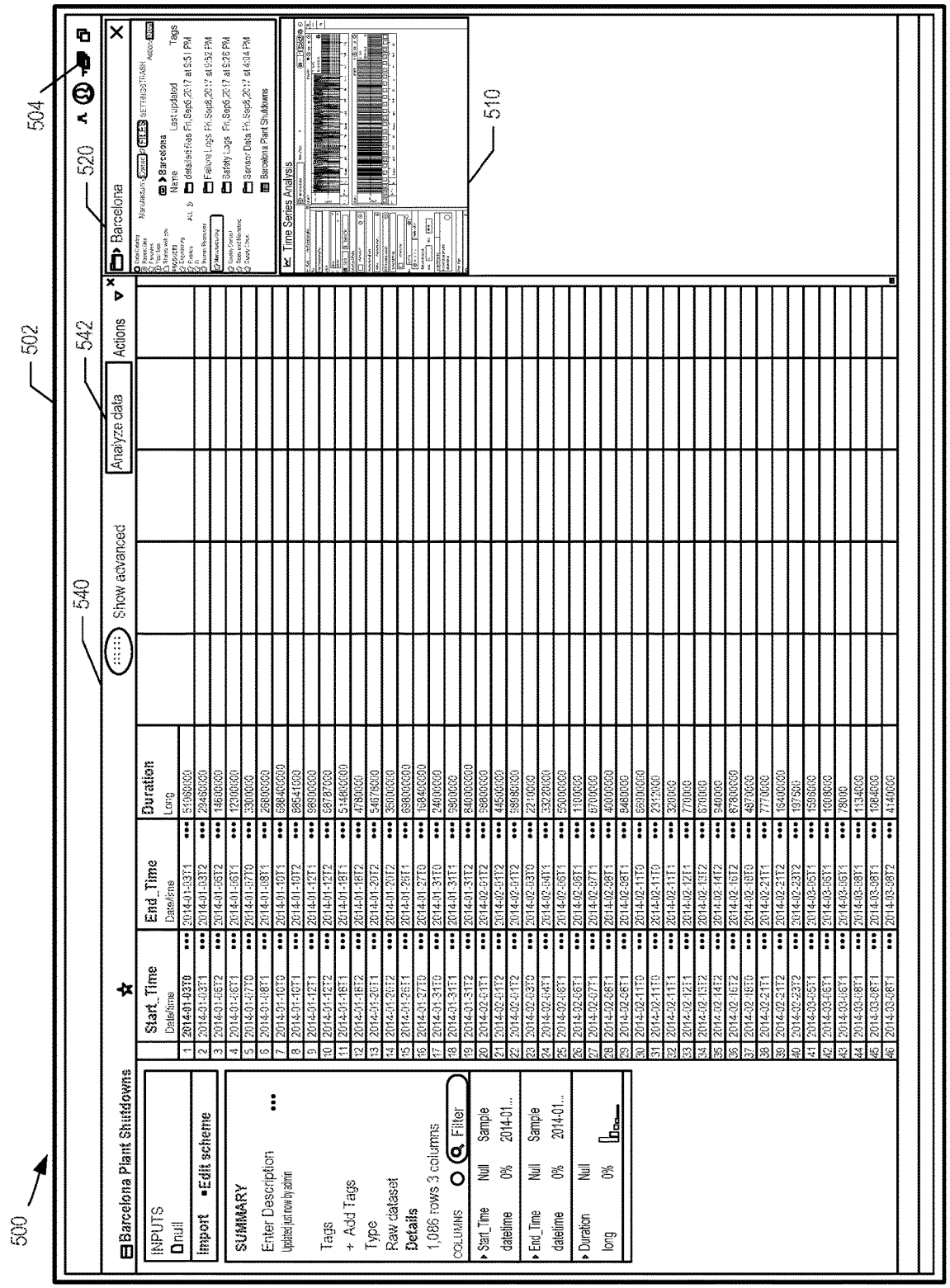
FIG. 5 illustrates another graphical user interface of a graphical user interface system, according to some embodiments of the present disclosure.

FIG. 5 illustrates another graphical user interface 500 of a graphical user interface system, according to some embodiments of the present disclosure. FIG. 5 can illustrate a continuation of the example(s) of FIGS. 1-4. The graphical user interface 500 can be similar to the graphical user interface(s) of FIGS. 1-4. The main window 502 includes a first window 510, a second window 520, and a third window 540. The main window 502 of FIG. 5 can be similar to the main window 402 of FIG. 4; the first window 510 of FIG. 5 can be similar to the first window 410 of FIG. 4; and the second window 520 of FIG. 5 can be similar to the second window 420 of FIG. 4. However, the graphical user interface 500 of FIG. 5 can include a new window 540 in contrast to the graphical user interface 400 of FIG. 4. For example, the analyst can open a new application in the window 540 to view the "Barcelona Plant Shutdowns" time series data. In response to a user interaction to view a data set, the updated graphical user interface 500 can present the new window 540 with the new application as larger than the second application in the second window 420 and as larger than the first application in the first window 410. In some embodiments, in response to a user interaction, the graphical user interface system can relocate windows to different locations instead of (or in addition to) changing the presentation sizes of windows. As described herein, windows can be scaled instead of resized to avoid the cost of reloading an application in a window, which can be a costly event since that might cause the application to re-render.

A user interaction with the graphical user interface 400 of FIG. 4 can cause the third application of the third window 540 to be opened in FIG. 5. For example, a user can select the "Barcelona Plant Shutdowns" data set in the document repository application of the second window 420 of FIG. 4 to view the data set in a data viewer. The third application of the third window 540 in FIG. 5 can be a data analysis application that includes a tabular data viewer. Accordingly, a tabular view of the time series data can be shown in the data analysis application of the third window 540. The analyst can select the "analyze data" user interface element 542.

Continuing with the description of a graphical user interface in a web application context, the main window 502 can be the parent window and the first window 510, the second window 520, and the third window 540 can be children of the parent window. As described herein, the parent and children windows can be with respect to a Document Object Model of a markup language (such as HTML). Again, the first window 510, the second window 520, and the third window 540 can include external frames, such as an iframe. In the example, the user interaction can cause the graphical use interface 500 to update dynamically and add a new external frame (with the embedded application), such as an iframe, to the main window 502.

Figure 6:
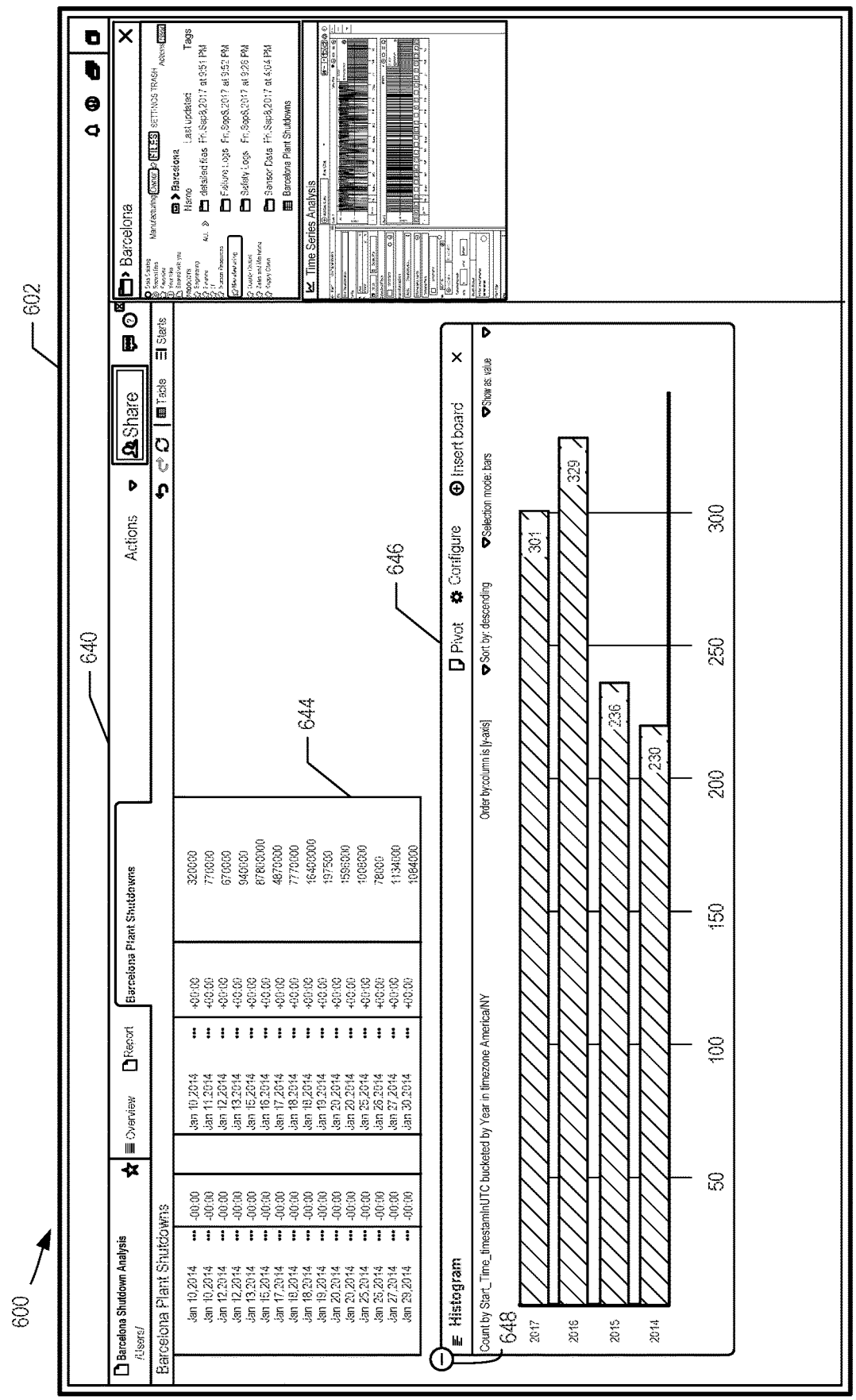
FIG. 6 illustrates yet another graphical user interface of a graphical user interface system, according to some embodiments of the present disclosure.

FIG. 6 illustrates yet another graphical user interface 600 of a graphical user interface system, according to some embodiments of the present disclosure. FIG. 6 can illustrate a continuation of the example(s) of FIGS. 1-5. The graphical user interface 600 can be similar to the graphical user interface(s) of FIGS. 1-5.

In the data analysis application in the third window 640, the analyst created a visualization 646, such as a histogram, summarizing the time series data. As illustrated, the data analysis application in the third window 640 can include a board user interface that allows a user to perform sequential filtering, charting, and transformations on data in a visual manner such that each transformation is shown sequentially down a user interface. As shown, the analyst has generated chart data in the form of a histogram 646 from the time series data 644, such as grouping the start times of the shutdown by year to see how many shutdowns occurred in each year.

In the example where the present year is 2017, the analyst can see from the histogram 646 that there are more shutdowns in 2016 and 2017 than the years 2015 and 2014. Thus, assuming there is more time left in the year, the 2017 is setting up to be a bad year for shutdowns.

The third window 640 includes a selectable user interface element 648. The selectable user interface element 648 of FIG. 6 can be similar to the selectable user interface element 116 of FIG. 1. The user interface element 648 is selectable by a user to interact with a resource, here the summary data visualization, a histogram chart. Similar to the element 116 of FIG. 1, the analyst can drag the element 648 to another window to allow another application to interact with the visualization data 646, which here corresponds to the histogram data for plant shutdowns.

Figure 7:
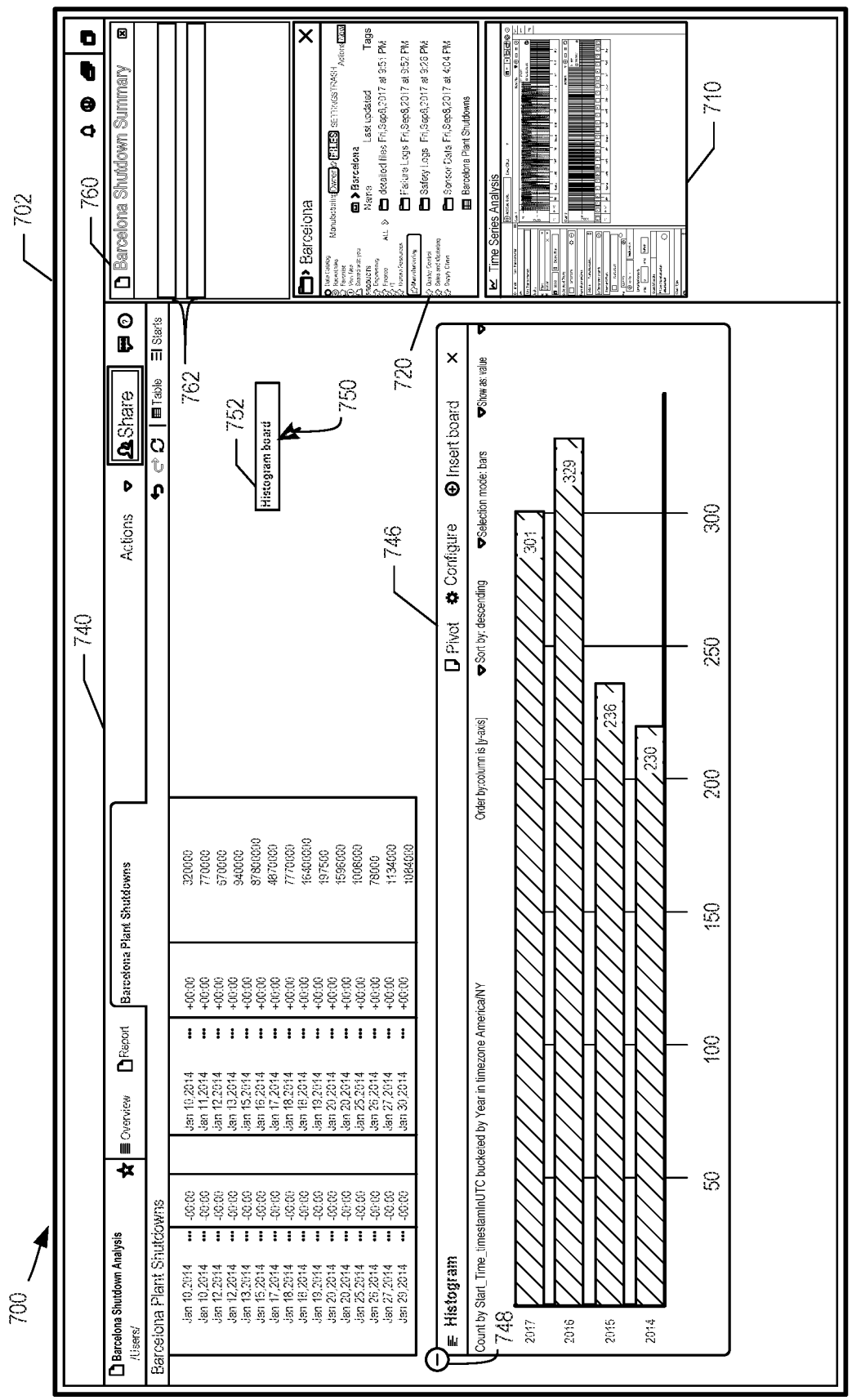
FIG. 7 illustrates another graphical user interface and another user interaction in a graphical user interface of a graphical user interface system, according to some embodiments of the present disclosure.

FIG. 7 illustrates another graphical user interface 700 of a graphical user interface system, according to some embodiments of the present disclosure. FIG. 7 can illustrate a continuation of the example(s) of FIGS. 1-6. The graphical user interface 700 can be similar to the graphical user interface(s) of FIGS. 1-6. The main window 702 includes a first window 710, a second window 720, a third window 740, and a fourth window 760. The main window 702 of FIG. 7 can be similar to the main window 502 of FIG. 5; the first window 710 of FIG. 7 can be similar to the first window 510 of FIG. 5; the second window 720 of FIG. 7 can be similar to the second window 520 of FIG. 5; and the third window 740 of FIG. 7 can be similar to the third window 640 of FIG. 6. However, the graphical user interface 700 of FIG. 7 can include a new window 760 in contrast to the graphical user interface 600 of FIG. 6. For example, the analyst opened a new application, such as a report application, in the fourth window 760 to create a "Barcelona Shutdown Summary" report. The user may have transitioned from the report application in the fourth window 760 to the data analysis application in the third window 740, which caused the fourth window 760 to be smaller than the third window 740.

FIG. 7 also illustrates another user interaction 750 in the graphical user interface 700 of a graphical user interface system, according to some embodiments of the present disclosure. In FIG. 7, similar to the user interaction 230 of FIG. 2, the user interaction 750, such as a drag interaction, can be a user selection of the selectable user interface element 748 and/or the resource representation 752. The user can effectively drag the visualization 746 (by dragging the user interface element 748), which can be similar to the visualization 646 of FIG. 6, to another window. In response to the start of the user interaction 750, an application or system can cause another user interface indication 762 to be shown in the fourth application in the fourth window 760.

As described herein, the start of the user interaction 750 can cause the first application of the first window 210 to transmit a message, such as on the messaging bus, which can be relayed to other applications, such as the fourth application in the fourth window 760 and the applications of the first and second windows 710, 720. The message can include a payload where the payload includes a data type for the data set (here a histogram or chart data type) and a resource identifier for the resource. Thus, the fourth application in the fourth window 760 can process the received message including the data type for the resource and determine that the data set is compatible with the fourth application, such as being able to receive a chart data type from the drop user interaction. The fourth application in the fourth window 760 can cause the user interface indication 762 to be shown in the fourth application in the fourth window 760. In contrast, the applications of the first and second windows 710, 720 can process the message and determine that the data type is not supported by the respective applications. In other embodiments, a central system may process the data types and inform the respective applications to display a user interface indication or not. As shown, an example user interface indication 762 is an indicated area, such as a visual box element or a highlighted area, which indicates to a user that the user selected item can be received within the area and/or the application of the window. For example, the user interface indication 762 of the fourth window 760 can indicate that the resource corresponding to the resource representation 752 can be passed to the report application of the fourth window 760.

Figure 8:
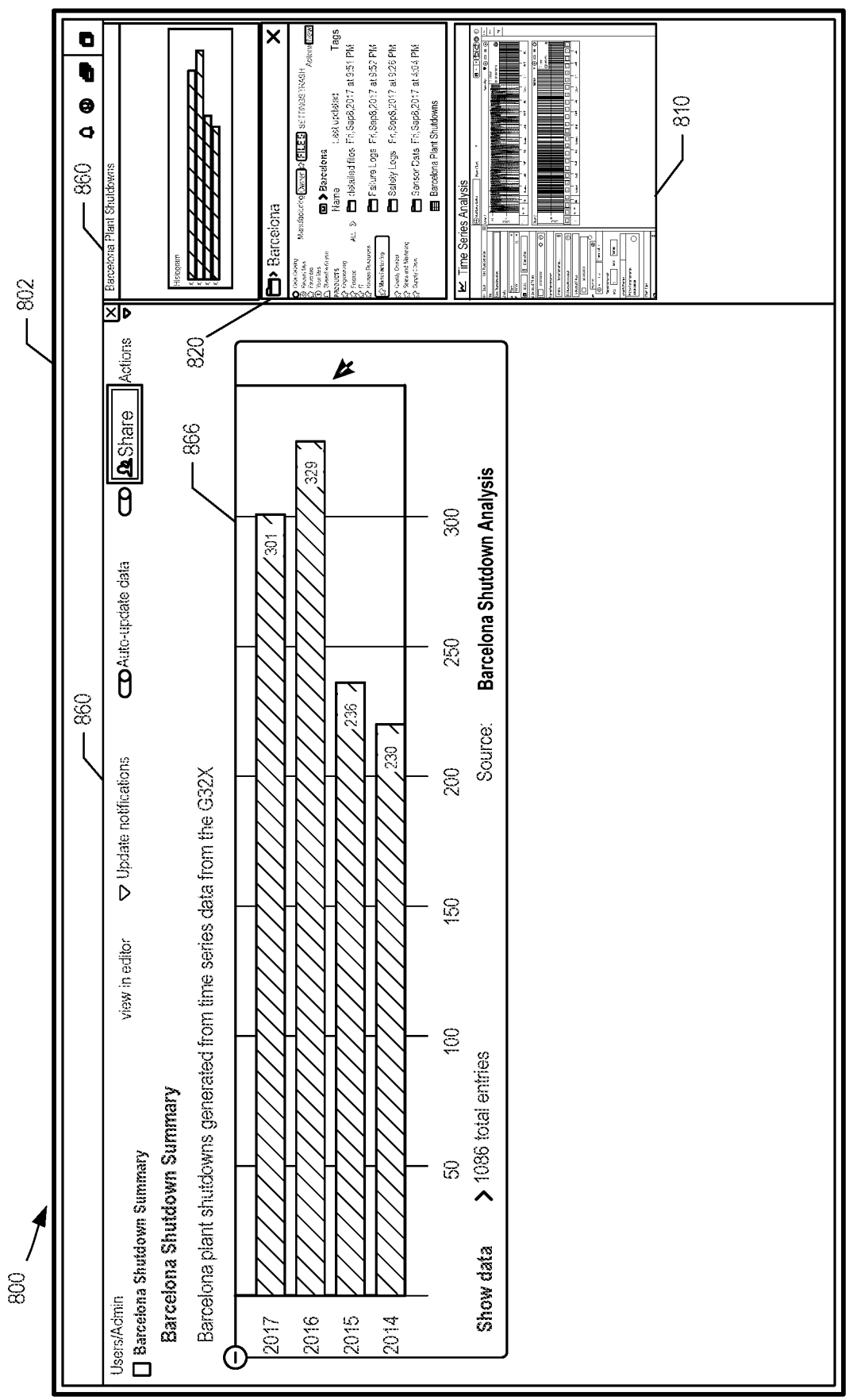
FIG. 8 illustrates another updated graphical user interface of a graphical user interface system, according to some embodiments of the present disclosure.

FIG. 8 illustrates another updated graphical user interface 800 of a graphical user interface system, according to some embodiments of the present disclosure. FIG. 8 can illustrate a continuation of the example(s) of FIGS. 1-7. The graphical user interface 800 can be similar to the graphical user interface(s) of FIGS. 1-7. The main window 802 includes a first window 810, a second window 820, a third window 840, and a fourth window 860. The main window 802 of FIG. 8 can be similar to the main window 702 of FIG. 7; the first window 810 of FIG. 8 can be similar to the first window 710 of FIG. 7; the second window 820 of FIG. 8 can be similar to the second window 720 of FIG. 7; the third window 840 of FIG. 8 can be similar to the third window 740 of FIG. 7; and the fourth window 860 of FIG. 8 can be similar to the fourth window 760 of FIG. 7. However, in response to a user interaction to drag and drop a resource, such as the user interaction 750 of FIG. 7, the updated graphical user interface 800 can present the fourth application in the fourth window 860 as larger than the third application in the third window 840, as larger than the second application in the second window 820, and as larger than the first application in the first window 810. In some embodiments, the graphical user interface can limit the number of windows that can be opened at the same time, such as five, six, or more windows. In other embodiments, there may not be such a fixed limit on the number of windows that can be opened at the same time.

In particular, the report application in the fourth window 860 includes a visualization section 866. The visualization section 866 can be similar to the visualization 746 of FIG. 7. Thus, via the user interaction 750, the analyst has taken a dynamically created visualization element and dropped it into a reporting application to create a summary of the investigation. Accordingly, while not illustrated, the analyst can perform many additional user interactions, transition between applications, interact with different applications, generate visualizations and data sets, and/or seamlessly communicate data between the applications while generally interacting with a single window that includes sub-windows of the graphical user interface system.

Figure 9:
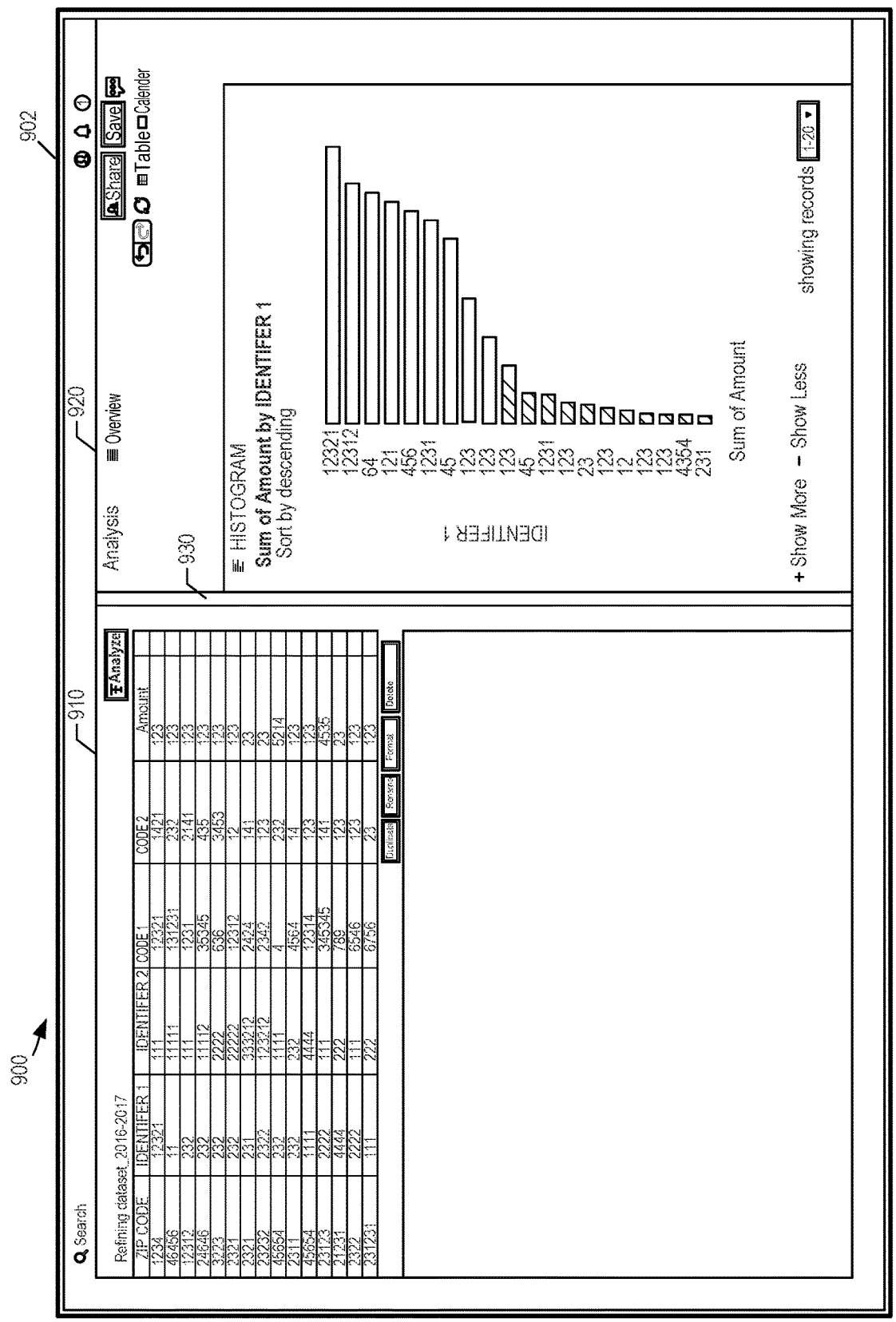
FIG. 9 illustrates yet another graphical user interface of a graphical user interface system, according to some embodiments of the present disclosure.

FIG. 9 illustrates yet another graphical user interface 900 of a graphical user interface system, according to some embodiments of the present disclosure. The graphical user interface 900 can be similar to the graphical user interface(s) of FIGS. 1-8. The main window 902 includes a first window 910 and a second window 920. The graphical user interface system of the graphical user interface 900 can be the same system (and/or can use the same framework) for the graphical user interface(s) of FIGS. 1-8. However, the layout, workflows, and the support for certain user interactions in the graphical user interface 900 may be different from the graphical user interface(s) of FIGS. 1-8. For example, the main window 902 can include a divider 930 that is adjustable by a user that automatically resizes the applications in the windows 910, 920 and/or the windows 910, 920.

As shown, the graphical user interface 900 displays a split screen view where a user can interact with the first application of the first window 910 and/or the second application of the second window 920. In the example of FIG. 9, the first application of the first window 910 can be a data cleaning application and the second application of the second window 920 can be a data analysis application similar to the data analysis application of the third window 640 in FIG. 6. As shown, the data analysis application of the second window 920 allows a user to generate a visualization from the underlying data. The underlying data can be the same data in the first application of the first window 910 and the second application of the second window 920. Thus, if the user modifies the underlying data using data cleaning application of the first window 910, then the data analysis application of the second window 920 may update automatically. For example, if the graphical user interface 900 uses the same external frame technology of the graphical user interface(s) of FIGS. 1-8, such as by using iframes, then each of the windows 910, 920 can include an external frame.

Figure 10:
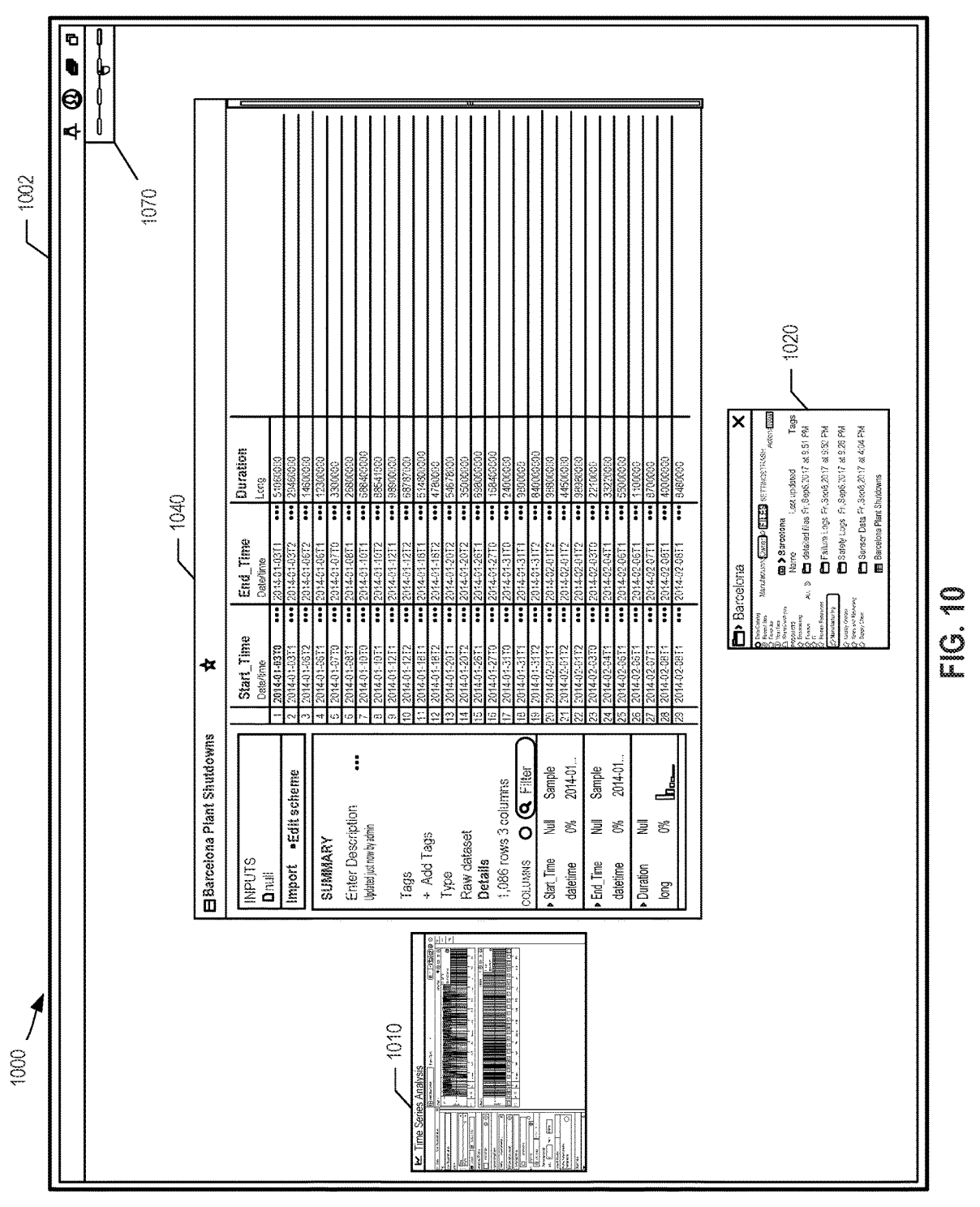

FIG. 10 illustrates an orientation graphical user interface of a graphical user interface system, according to some embodiments of the present disclosure. FIG. 10 can illustrate a continuation of the example(s) of FIGS. 1-5. The graphical user interface 1000 can be similar to the graphical user interface(s) of FIGS. 1-5. The main window 1002 includes a first window 1010, a second window 1020, and a third window 1040. The main window 1002 of FIG. 10 can be similar to the main window 502 of FIG. 5; the first window 1010 of FIG. 10 can be similar to the first window 510 of FIG. 5; the second window 1020 of FIG. 10 can be similar to the second window 520 of FIG. 5; and the third window 1040 of FIG. 10 can be similar to the third window 540 of FIG. 5. However, the graphical user interface 1000 of FIG. 10 can present an orientation view. For example, in FIG. 5, the analyst can select the orientation element 504 that causes presentation of the graphical user interface 1000 of FIG. 10.

The orientation view of the graphical user interface 1000 can present the windows 1010, 1020, 1040 in a layout that is logically grouped and/or arranged. Following a user selection of the orientation element 504 of FIG. 5, the third window 1040 can be shown as the largest window because the third window 1040 is the currently active window. In the layout, the first window 1010 can be shown in an area that indicates any corresponding applications that fed data or a resource into the current context (here the application of the third window 1040). In this example, the designated area for input applications is to the left of the primary window 1040. Another area in the graphical user interface 1000 can be designated for applications that are currently open within the graphical user interface system but that are less directly related (or not related at all) to the application of the primary window 1040. Accordingly, the document repository application of the second window 1020 is shown below the primary window 1040.

As described herein, the graphical user interface system can store some user interactions between the applications in the sub-windows. Accordingly, the graphical user interface system can present graphical user interfaces that display relationships between the multiple applications, such as the graphical use interface 1000.

Figure 11:
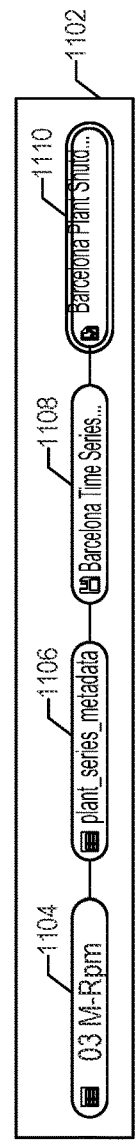
FIG. 11 illustrates a historical graphical user interface of a graphical user interface system, according to some embodiments of the present disclosure.

FIG. 11 illustrates a historical graphical user interface 1100 of a graphical user interface system, according to some embodiments of the present disclosure. FIG. 11 can illustrate a continuation of the example(s) of FIGS. 1-5 and 10. The graphical user interface 1100 includes a graph 1102. The graph 1102 includes node representations 1004, 1106, 1108, 1110. The graphical user interface 1100 can present a historical view. For example, in FIG. 10, the analyst can select the historical element 1070 that causes presentation of the graphical user interface 1100.

As shown, the graph 1102 can present a historical view of the analyst's session with the graphical user interface system as well as other information. For example, the first node 1104 can represent an initial data set, such as the sensor motor data from the Barcelona plant. The second node 1106 can represent metadata or a transformation of the initial data from the node 1104. The third node 1108 can represent a data set that was generated from the graphical user interface system, such as the time series data from FIGS. 1-3. The fourth node 1108 can represent a resource, such as analysis, that was generated from the graphical user interface system, such as the analysis in the data analysis application of FIG. 5. Thus, the graph 1102 can represent a history of the analyst's session within the graphical user interface of FIGS. 1-5 (and potentially other relevant contextual information), which enables an analyst to understand where the data came from, how an analyst came to a particular conclusion, and what various user interactions, transformations, and/or applications interacted with the data to get to the present state. In some embodiments, the graph 1102 can be a directed graph. The direction of the nodes in the graph 1102 can indicate a flow of the data and/or user interactions. In the example, the direction of the graph 1102 proceeds from the first node 1104 to the second node 1106 and so on.

As described herein, the graphical user interface system can store user interactions and/or actions associated with the underlying data to generate the graph 1102. In some embodiments, the graph 1102 can be associated with a session of the graphical user interface system. Thus, if the analyst starts a new session within the graphical user interface system, the analyst can view a different graph than the graph 1102 of FIG. 11 where the different graph is associated with the new session. In some embodiments, a user can create a new session, save a session, and/or open an existing session within the graphical user interface system. The session can include the state of the graphical user interface system including what applications, data sets, and windows were open in that session. The graphical user interface system can process the messages described herein to store one or more corresponding user interaction records.

Figure 12:
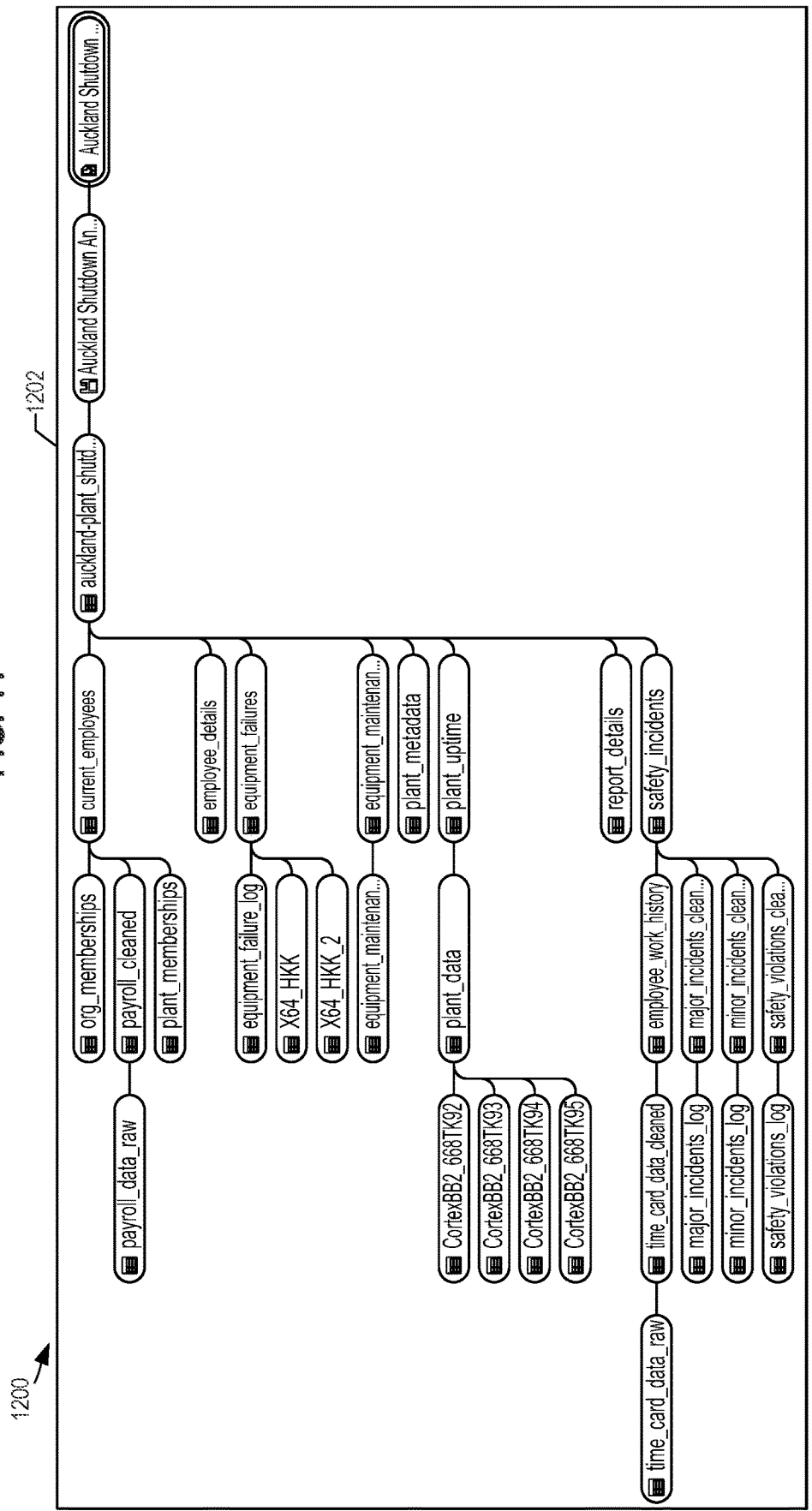
FIG. 12 illustrates another historical graphical user interface of a graphical user interface system, according to some embodiments of the present disclosure.

FIG. 12 illustrates another historical graphical user interface 1200 of a graphical user interface system, according to some embodiments of the present disclosure. The graphical user interface 1200 includes a graph 1202. The graphical user interface 1200 of FIG. 12 can be similar to the graphical user interface 1100 of FIG. 11. For example, the graph 1202 can be similar to the graph 1102 of FIG. 11. However, as shown, the graph 1202 of FIG. 12 includes more nodes and different nodes than the graph 1102 of FIG. 11. The graph 1202 of FIG. 12 can represent a different session within the graphical user interface system.

Example Graphical User Interface System

Figure 13:
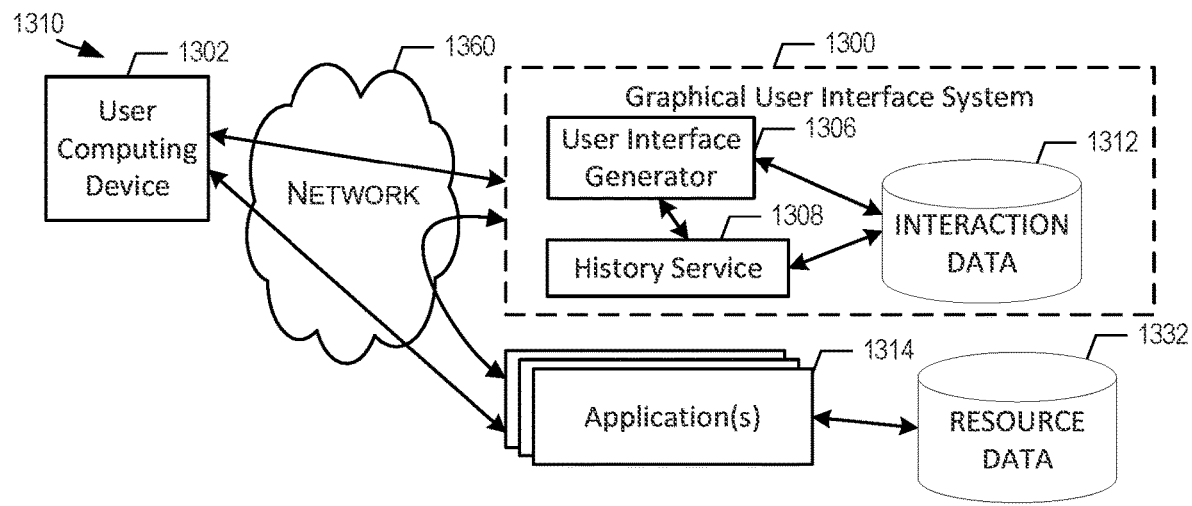
FIG. 13 illustrates a graphical user interface system, according to some embodiments of the present disclosure.

FIG. 13 illustrates a graphical user interface system 1300, according to some embodiments of the present disclosure. In the embodiment of FIG. 13, the computing environment 1310 includes a network 1360, a graphical user interface system 1300, a user computing device 1302, one or more applications 1314, and a resource data storage 1332.

Various communications between these devices are illustrated. The user computing device 1302 can communicate with the graphical user interface system 1300 and/or the one or more applications 1314. For example, the user computing device 1302 may send a request to the one or more applications 1314 and the graphical user interface system 1300 may send a response to the one or more applications 1314. Likewise, the user computing device 1302 may send a request to the graphical user interface system 1300 and the graphical user interface system 1300 may send a response to the user computing device 1302. The user computing device 1302 may transmit user interaction data to the graphical user interface system 1300 and/or the one or more applications 1314. The graphical user interface system 1300 can communicate with one or more applications 1314. In some embodiments, some of the one or more applications 1314 can be hosted separately from the graphical user interface system 1300. Some of the one or more applications 1314 can be external the graphical user interface system 1300. In a web context, the one or more applications 1314 can be hosted on a separate domain from the graphical user interface system 1300. Other communications between these devices are described in further detail below. For example, the graphical user interface system 1300 and/or the one or more applications 1314 can communicate with each other via a messaging bus, which is described in further detail below with respect to FIG. 14.

The example graphical user interface system 1300 includes a user interface generator 1306 and an interaction data storage 1312. The user interface generator 1306 can cause presentation of a graphical user interface. The user interface generator 1306 and/or the history service 1308 can receive user interaction data from the user computing device 1302. The user interface generator 1306 and/or the history service 1308 can store some user interaction data in the interaction data storage 1312. Records regarding the output of the user interactions, such as records regarding transformed data or generated reports or data as well as the applications and the order that the data was interacted with, can be stored in the interaction data storage 1312. The history service 1308 can determine which user interactions should be stored as records in the interaction data storage 1318. The history service 1308 can also receive or determine updates to underlying data that is related to the user interfaces of a user session in the graphical user interface system 1300. The records regarding user interactions and/or data transformations can be used to show alternative views in the graphical user interface system 1300. The user interface generator 106 can generate a graphical user interface based on some of the user interaction data and/or other data in the interaction data storage 1312. For example, a historical view of user interactions and/or data transformations via the graphical user interface can be shown in the graphical user interface.

As described herein, the graphical user interface of the graphical user interface system 1300 can present sub-windows. Some of the sub-windows can correspond to the one or more applications 1314. The graphical user interface data generated by the user interface generator 106, such as markup data (e.g., HTML), can cause the user computing device to request additional graphical user interface data from the one or more applications 1314 via the network 1360. The one or more applications 1314 can retrieve resource data from the resource data storage 1312, which can be presented in corresponding graphical user interfaces.

Figure 14:
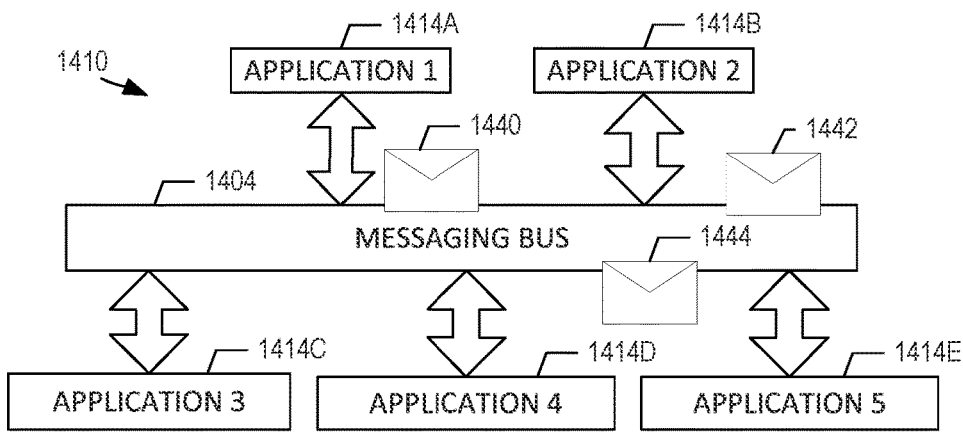
FIG. 14 illustrates a messaging bus, according to some embodiments of the present disclosure.

FIG. 14 illustrates a messaging bus 1404, according to some embodiments of the present disclosure. In the embodiment of FIG. 14, a computing environment 1410 includes the messaging bus 1404, the applications 1414A-1414E, and messages 1440, 1442, 1444. The number of applications 1414A-1414E and messages 1440, 1442, 1444 shown in FIG. 14 are illustrative. Other embodiments can include more or less applications and/or messages. The applications 1414A-1414E can correspond to the one or more applications 1314 of FIG. 13.

As depicted, the applications 1414A-1414E can communicate via the messaging bus 1404. In some embodiments, the graphical user interface system 1300 can include the messaging bus 1404. Thus, the graphical user interface system 1300 and/or the messaging bus 1404 can act as a coordinator between the applications 1414A-1414E. Thus, the applications 1414A-1414E can transmit the messages 1440, 1442, 1444 via the messaging bus 1404, which is included in the graphical user interface system 1300. In other embodiments, the messaging bus 1404 can be separate from the graphical user interface system 1300, and, while not illustrated, the graphical user interface system 1300 can communicate with the applications 1414A-1414E via the messaging bus 1404.

Examples of the messages 1440, 1442, 1444 include messages related to user interactions. For example, a first application 1414A can detect a user interaction, such as an interaction for the start of a drag user interaction. In response to detecting the user interaction, such as a drag user interaction, the first application 1414A can generate and transmit a first message 1440, such as a drag event message, to the messaging bus 1404. The payload can include a data type, such as a database data type, for example, and a resource identifier, such as an identifier for the underlying data. The payload can also include information such as a user identifier for the user using the graphical user interface system. The messaging bus 1404 can transmit the first message 1440 to one or more other applications 1414B-1414E. For example, upon receiving the first message 1440, the one or more other applications 1414B-1414E can present an updated user interface indication, such as an indicator that the user can drop the resource in the one or more other applications 1414B-1414E. The one or more other applications 1414B-1414E may determine from the payload that the data type of the resource is compatible with the application.

A second application 1442 can transmit a second message 1442, such as a drop event message, to the messaging bus 1404. The drop event message can include a source indication identifying the first application 1414A, a destination indication identifying the second application 1414B, and the resource identifier. Again, the messaging bus 1404 can transmit the second message 1440 to other applications, such as the first, third, or fourth applications 1414A, 1414C, 1414D, 1414E. The second message 1442 can cause one of the first, third, or fourth applications 1414A, 1414C, 1414D, 1414E, or the graphical user interface system 1300 (not illustrated) to update a corresponding graphical user interface. For example, the presentation of the first application 1414A can change from a larger window to a smaller window and the second application 1414B can change from a smaller window to a larger window, such as in the case of a resource drag and drop from the first application 1414A to the second application 1414B.

In some embodiments and a web context, the graphical user interface system 1300 can include a web application that is presented in a main window and the messaging bus 1404 can be included in the graphical user interface system 1300. As described herein, the sub-windows in the main window can correspond to iframes and the applications 1414A-1414E, and, therefore, the applications 1414A-1414E can communicate via the messaging bus 1404 in the graphical user interface system 1300. The messages 1440,

1442, 1444 and the messaging bus 1404 can use the HTTP protocol, and, in particular, HTTP POST message protocol. Thus, the applications 1414A-1414E in iframes, which can be externally hosted, can communicate securely via HTTP POST messages using the messaging bus 1404 of the graphical user interface system 1300. Thus, the graphical user interface system 1300 can act as a coordinator by receiving messages from one of the applications 1414A-1414E and transmitting the same or other messages to any of the other applications 1414A-1414E.

Example Data Management System

Figure 15:
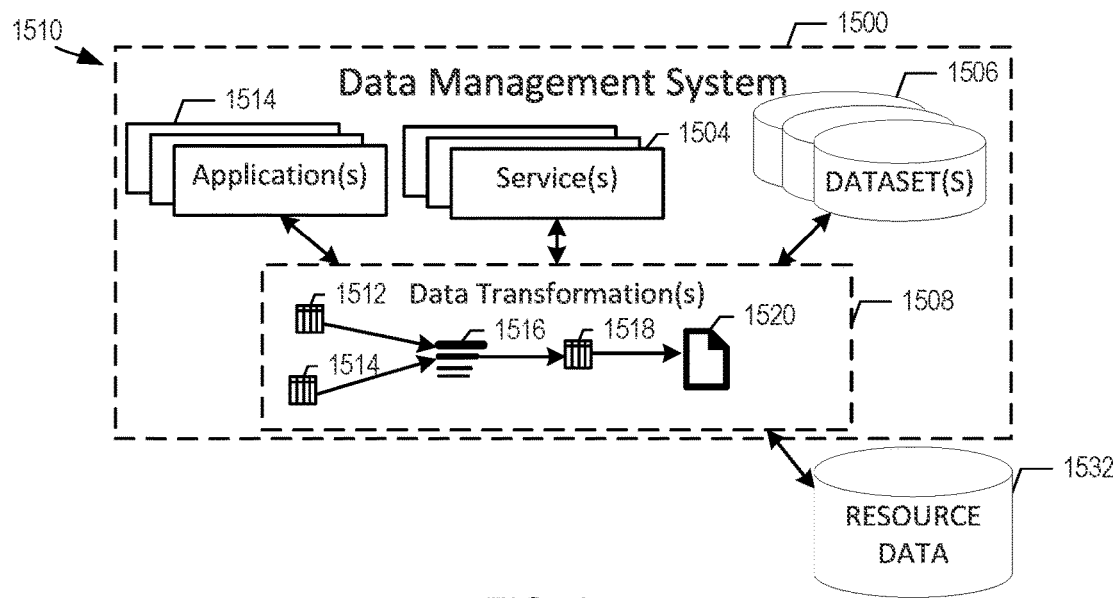
FIG. 15 is a block diagram illustrating a data management system for use with a graphical user interface system, according to some embodiments of the present disclosure.

FIG. 15 illustrates an example data management system 1500 for use with the graphical user interface system, according to some embodiments of the present disclosure. In the embodiment of FIG. 15, a computing environment 1510 can be similar to, overlap with, and/or be used in conjunction with the computing environment 110 of FIG. 1. For example, the computing environment 1510 can include one or more applications 1514 and a resource data storage 1532, each of which may be similar to respective devices and systems in the computing environment 110 of FIG. 1, such as the one or more applications 1314 and the resource data storage 1332. However, the computing environment 1510 can also include a data management system 1500.

The example data management system 1500 includes one or more applications 1514, one or more services 1504, one or more initial datasets 1506, and a data transformation process 1508 (also referred to herein as a build process). The example data management system 1500 can include a data pipeline system. The data management system 1500 can transform data and record the data transformations. The one or more applications 1514 can include applications that enable users to view datasets, interact with datasets, filter data sets, and/or configure dataset transformation processes or builds. The one or more services 1504 can include services that can trigger the data transformation builds and API services for receiving and transmitting data. The one or more initial datasets 1506 can be automatically retrieved from external sources and/or can be manually imported by a user. The one or more initial datasets 1506 can be in many different formats such as a tabular data format (SQL, delimited, or a spreadsheet data format), a data log format (such as network logs), or time series data (such as sensor data).

The data management system 1500, via the one or more services 1504, can apply the data transformation process 1508. An example data transformation process 1508 is shown. The data management system 1500 can receive one or more initial datasets 1512, 1514. The data management system 1500 can apply a transformation to the dataset(s). For example, the data management system 1500 can apply a first transformation 1516 to the initial datasets 1512, 1514, which can include joining the initial datasets 1512, 1514 (such as or similar to a SQL JOIN), and/or a filtering of the initial datasets 1512, 1514. The output of the first transformation 1516 can include a modified dataset 1518. A second transformation 1520 of the modified dataset 1518 can result in an output dataset 1520, such as a report. Each of the steps in the example data transformation process 1508 can be recorded by the data management system 1500 and made available as a resource to the graphical user interface system 1300. For example, a resource can include a dataset and/or a dataset item, a transformation, or any other step in a data transformation process. As mentioned above, the data transformation process or build 1508 can be triggered by the data management system 1500, where example triggers can include nightly build processes, detected events, or manual triggers by a user. Additional aspects of data transformations and the data management system 1500 are described in further detail below.

The techniques for recording and transforming data in the data management system 1500 may include maintaining an immutable history of data recording and transformation actions such as uploading a new dataset version to the system 1500 and transforming one dataset version to another dataset version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable (ACID) transactions.

The catalog can include versioned immutable "datasets." More specifically, a dataset may encompass an ordered set of conceptual dataset items. The dataset items may be ordered according to their version identifiers recorded in the catalog. Thus, a dataset item may correspond to a particular version of the dataset. A dataset item may represent a snapshot of the dataset at a particular version of the dataset. As a simple example, a version identifier of '1' may be recorded in the catalog for an initial dataset item of a dataset. If data is later added to the dataset, a version identifier of '2' may be recorded in the catalog for a second dataset item that conceptually includes the data of the initial dataset item and the added data. In this example, dataset item '2' may represent the current dataset version and is ordered after dataset item '1'.

As well as being versioned, a dataset may be immutable. That is, when a new version of the dataset corresponding to a new dataset item is created for the dataset in the system, pre-existing dataset items of the dataset are not overwritten by the new dataset item. In this way, pre-existing dataset items (i.e., pre-existing versions of the dataset) are preserved when a new dataset item is added to the dataset (i.e., when a new version of the dataset is created). Note that supporting immutable datasets is not inconsistent with pruning or deleting dataset items corresponding to old dataset versions. For example, old dataset items may be deleted from the system to conserve data storage space.

A version of dataset may correspond to a successfully committed transaction against the dataset. In these embodiments, a sequence of successfully committed transactions against the dataset corresponds to a sequence of dataset versions of the dataset (i.e., a sequence of dataset items of the dataset).

A transaction against a dataset may add data to the dataset, edit existing data in the dataset, remove existing data from the dataset, or a combination of adding, editing, or removing data. A transaction against a dataset may create a new version of the dataset (i.e., a new dataset item of the dataset) without deleting, removing, or modifying pre-existing dataset items (i.e., without deleting, removing, or modifying pre-existing dataset versions). A successfully committed transaction may correspond to a set of one or more files that contain the data of the dataset item created by the successful transaction. The set of files may be stored in a file system.

In the catalog, a dataset item of a dataset may be identified by the name or identifier of the dataset and the dataset version corresponding to the dataset item. In a preferred embodiment, the dataset version corresponds an identifier assigned to the transaction that created the dataset version. The dataset item may be associated in the catalog with the set of files that contain the data of the dataset item. In a preferred embodiment, the catalog treats the set of files as opaque. That is, the catalog itself may store paths or other identifiers of the set of files but may not otherwise open, read, or write to the files.

In sum, the catalog may store information about datasets. The information may include information identifying different versions (i.e., different dataset items) of the datasets. In association with information identifying a particular version (i.e., a particular dataset item) of a dataset, there may be information identifying one or more files that contain the data of the particular dataset version (i.e., the particular dataset item).

The catalog may store information representing a non-linear history of a dataset. Specifically, the history of a dataset may have different dataset branches. Branching may be used to allow one set of changes to a dataset to be made independent and concurrently of another set of changes to the dataset. The catalog may store branch names in association with dataset version identifiers for identifying dataset items that belong to a particular dataset branch.

The catalog may provide dataset provenance at the transaction level of granularity. As an example, suppose a transformation is executed in the data management system 1500 multiple times that reads data from dataset A, reads data from dataset B, transforms the data from dataset A and the data from dataset B in some way to produce dataset C. As mentioned, this transformation may be performed multiple times. Each transformation may be performed in the context of a transaction. For example, the transformation may be performed daily after datasets and B are updated daily in the context of transactions. The result being multiple versions of dataset A, multiple versions of dataset B, and multiple versions of dataset C as a result of multiple executions of the transformation. The catalog may contain sufficient information to trace the provenance of any version of dataset C to the versions of datasets A and B from which the version of dataset C is derived. In addition, the catalog may contain sufficient information the trace the provenance of those versions of datasets A and B to the earlier versions of datasets A and B from which those versions of datasets A and B were derived.

The provenance tracking ability is the result of recording in the catalog for a transaction that creates a new dataset version, the transaction or transactions that the given transaction depends on (e.g., is derived from). The information recorded in the catalog may include an identifier of each dependent transaction and a branch name of the dataset that the dependent transaction was committed against.

According to some embodiments, provenance tracking extends beyond transaction level granularity to column level granularity. For example, suppose a dataset version A is structured as a table of two columns and a dataset version B is structured as a table of five columns. Further assume, column three of dataset version B is computed from column one of dataset version A. In this case, the catalog may store information reflecting the dependency of column three of dataset version B on column one of dataset version A.

The catalog may also support the notion of permission transitivity. For example, suppose the catalog records information for two transactions executed against a dataset referred to in this example as "Transaction 1" and Transaction 2." Further suppose a third transaction is performed against the dataset which is referred to in this example as "Transaction 3." Transaction 3 may use data created by Transaction 1 and data created by Transaction 2 to create the dataset item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance tracking in the catalog has column level granularity. Then permission transitivity may apply at the more fine-grained column-level. In this case, permission may be revoked (or granted) on a particular column of a dataset and based on the column-level provenance tracking in the catalog, permission may be transitively revoked on all direct or indirect descendent columns of that column.

A build service can manage transformations which are executed in the system to transform data. The build service may leverage a directed acyclic graph data (DAG) structure to ensure that transformations are executed in proper dependency order. The graph can include a node representing an output dataset to be computed based on one or more input datasets each represented by a node in the graph with a directed edge between node(s) representing the input dataset(s) and the node representing the output dataset. The build service traverses the DAG in dataset dependency order so that the most upstream dependent datasets are computed first. The build service traverses the DAG from the most upstream dependent datasets toward the node representing the output dataset rebuilding datasets as necessary so that they are up-to-date. Finally, the target output dataset is built once all of the dependent datasets are up-to-date.

The data management system 1500 can support branching for both data and code. Build branches allow the same transformation code to be executed on multiple branches. For example, transformation code on the master branch can be executed to produce a dataset on the master branch or on another branch (e.g., the develop branch). Build branches also allow transformation code on a branch to be executed to produce datasets on that branch. For example, transformation code on a development branch can be executed to produce a dataset that is available only on the development branch. Build branches provide isolation of re-computation of graph data across different users and across different execution schedules of a data pipeline. To support branching, the catalog may store information represents a graph of dependencies as opposed to a linear dependency sequence.

The data management system 1500 may enable other data transformation systems to perform transformations. For example, suppose the system stores two "raw" datasets R1 and R2 that are both updated daily (e.g., with daily web log data for two web services). Each update creates a new version of the dataset and corresponds to a different transaction. The datasets are deemed raw in the sense that transformation code may not be executed by the data management system 1500 to produce the datasets. Further suppose there is a transformation A that computes a join between datasets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all datasets that depend on an upstream dataset or an upstream transformation that has been updated are automatically determined based on information in the catalog and rebuilt. In this case, the build service may accept a target dataset or a target transformation as an input parameter to a push build command. The build service than determines all downstream datasets that need to be rebuilt, if any.

As an example, if the build service receives a push build command with dataset R1 as the target, then the build service would determine all downstream datasets that are not up-to-date with respect to dataset R1 and rebuild them. For example, if dataset D1 is out-of-date with respect to dataset R1, then dataset D1 is rebuilt based on the current versions of datasets R1 and R2 and the current version of transformation A. If dataset D1 is rebuilt because it is out-of-date, then dataset D2 will be rebuilt based on the up-to-date version of dataset D1 and the current version of transformation B and so on until all downstream dataset of the target dataset are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a dataset or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, etc.

The schema information can be accessible via the schema metadata service may versioned separately from the data itself in the catalog. This allows the schemas to be updated separately from datasets and those updates to be tracked separately. For example, suppose a comma separated file is uploaded to the system as particular dataset version. The catalog may store in association with the particular dataset version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of datasets and schema information. For example, suppose transformation A described above in a previous example that accepts the dataset R1 and dataset R2 as input is the target of a build command issued to the build service. In response to this build command, the build service may determine from the catalog the file or files in which the data of the current versions of datasets R1 and R2 is stored. The build service may then access the schema metadata service to obtain the current versions of the schema information for the file or files. The build service may then provide all of identifiers or paths to the file or files and the obtained schema information to the data transformation engine to execute the transformation A. The underlying data transformation engine interprets the schema information and applies it to the data in the file or files when executing the transformation A.

Example User Interface Generation

Figure 16:
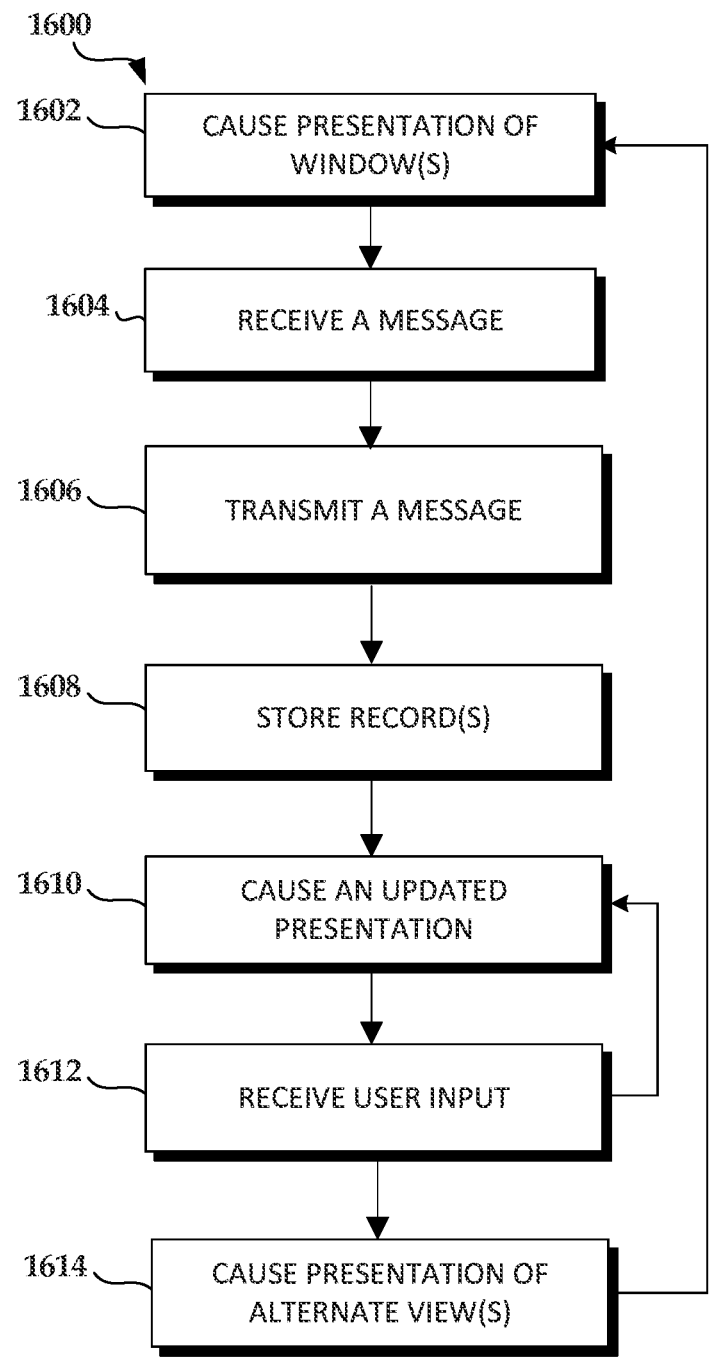
FIG. 16 is a flowchart of an example method of generating user interfaces, according to some embodiments of the present disclosure.

FIG. 16 is a flowchart of an example method 1600 of generating user interfaces, according to some embodiments of the present disclosure. Although the method 1600 is described in conjunction with the systems of FIG. 13, any system configured to perform the method, in any order, is within the scope of this disclosure. The method 1600 may be performed by the various components of the graphical user interface system 1300 of FIG. 13 as discussed herein, including the user interface generator 1306 and/or the history service 108. Depending on the embodiment, the method 1600 may include fewer or additional blocks and/or the blocks may be performed in an order different than is illustrated. Other embodiments of the method 1600 may include less blocks than illustrated or the blocks may be performed in a different order than as illustrated.

Beginning at block 1602, one or more windows can be presented. For example, the user interface generator 106 can cause one or more windows to be presented. An example presentation of windows is the presentation of the first window 110 and the second window 1120 described in further detail above with respect to FIG. 1. As described herein, a graphical user interface and/or application can be presented within the one or more windows. The presentation of a first window can be larger than the presentation of a second window. In the example of FIG. 1, the first window 110 can be the primary window, such as the current application that a user is interacting with, and the second window 120 can be a secondary window. The primary window can be presented as larger than a secondary window.

As described herein, a main window can include one or more sub-windows, such as a parent window having one or more children windows. In a web application context, the main window can be the parent window of a first window and a second window, such as the children in a Document Object Model of a markup language (such as HTML). Moreover, the one or more windows can include external frames, such as an iframe, that enables the respective applications, which can be hosted separately from the application of the main window, to be embedded in the main window. The user interface generator 106 may initially present a main window with no sub-windows. Thereafter, one or more applications may be opened by a user and one or more sub-windows can be dynamically generated by the user interface generator 106. In a web context, the user interface generator 106 can dynamically add iframes with the respectively embedded applications to the Document Object Model.

At block 1604, a message is received. For example, the graphical user interface system 1300 can receive a message. An example message is a drag event message. The message can include a payload from an application in a window. An example payload can include a data type, a resource identifier, metadata, a user identifier, other data, and/or some combination thereof. As described herein, the applications in the windows can send messages to cause the user interface to update. In the example of FIG. 1, the user interface element 116 is selected by a user (such as by being dragged), which can cause a drag event message to be sent from the application in the first window 110 to the graphical user interface system 1300.

In some embodiments, the graphical user interface system 1300 can include the messaging bus 1404, which is described in further detail with respect to FIG. 14. For example, in response to detecting the user interaction, an application can generate and transmit a message to the messaging bus 1404, which can be used by the graphical user interface system 1300.

At block 1606, a message can be transmitted. For example, the graphical user interface system 1300 can transmit a message. An example message that can be transmitted is a drag event message. As described herein, the message can include a payload from an application in a window; and an example payload can include a data type, a resource identifier, metadata, a user identifier, other data, and/or some combination thereof. As described herein, the graphical user interface system 1400 can send messages to applications that can cause the respective applications to update. A message can be transmitted to an application that causes the application in a window to present an updated user interface indication based at least in part on the message. For example, the data type in the payload of a message can indicate that a data set is being dragged, and an application receiving the message can display a visual element to indicate to the user that the data set can be dropped within the application. In the example of FIG. 1, the user interface element 116 is dragged by a user, which can cause a drag event message to be sent to the graphical user interface system 1300 and the graphical user interface system 1300 can transmit the drag event message to other application(s).

In embodiments where the graphical user interface system 1300 includes the messaging bus 1404, the messaging bus 1404 can transmit the message to other applications. For example, in response to receiving a drag event message from an application, the messaging bus 1404 can transmit the drag event message to other applications.

An additional type of message that can be received and/or sent includes a drop event message. An example drop event message includes a source indication identifying a first application in the first window, a destination indication identifying a second application in a second window, and a resource identifier. In the drop event message example, the source indication can identify the application/window where the data being dropped originated from; the destination indication can identify the application/window where the data was dropped; and the resource identifier can identify the data being dropped. In the example of FIGS. 3 and 4, the second application of the second window 320, 420, respectively, can transmit a drop message in response to the time series data being dropped in the document repository application. In some embodiments, in response to receiving the drop event message, the graphical user interface system 1300 can cause an updated presentation of a second application in a second window as larger than a first application in a first window based at least in part on the source indication and the destination indication of the drop event message. The application that received a dropped item can transmit a drop event message to the graphical user interface system 1300 or to the messaging bus 1404. Further, the application that received a dropped item can access or retrieve data associated with the item and update the graphical user interface for the application accordingly. The source indication and the destination indication of the drop event message can indicate An additional type of message that can be received and/or sent includes an update message. An example update message can cause an application to update. For example, the graphical user interface system 1300 can transmit an update message to cause an application to retrieve data or update. The graphical user interface system 1300, such as by using an overlay on one or more sub-windows, can detect a drop event intended for an application of a sub-window. In some embodiments, if a drop event message is received, the graphical user interface system 1300 can transmit an update message to the application that causes the application to update, such as by retrieving data indicated by a resource identifier and updating the application's graphical user interface based on the retrieved data.

At block 1608, one or more records can be stored. For example, the history service 1308 can store records in the interaction data storage 1312. As described herein, various user interactions with the graphical user interface system 1300 can be stored that enables views regarding the history of those user interactions. For example, the history service 1308 can store a record of a drag and drop interaction for a resource identifier between a first application in a first window and a second application in a second window. Thus, at a later time, a user can view the history of the user interactions, such as the user interaction that the data set was dragged from one application to another application. In some embodiments, such as in a web context, the records can be stored in memory by the main application for the main window of the graphical user interface system 1300.

In some embodiments, the history service 1308 can store records based on the messages received from the applications, such as messages regarding drag and drop events and other updates to the applications. Another message type can include one or more applications within a single application. For example, within a single application, a user could join two data sets, which might be stored within a record in the interaction data storage 1312. Moreover, in some embodiments, the history service 1308 can look for or receive updates regarding data sets that have been modified by other services or systems, and store that information in the interaction data storage 1312. Thus, the graphical user interface can keep a comprehensive history of interactions with data in and out of the graphical user interface system 1300.

At block 1610, the presentation of graphical user interface(s) can be updated. For example, the user interface generator 106 can update the presentation of one or more graphical user interface(s). The user interface generator 106 can cause an updated presentation of a second application in a second window as larger than a first application in a first window based at least in part on a source indication and a destination indication of the drop event message. In the drag-and-drop example of FIGS. 1-4, the user interface generator 106 causes the updated graphical user interface 400 of FIG. 4 to be presented following a drag-and-drop user interaction. As such, the second window 420 is shown as larger than the first window 410 based on the data from the drop event message that indicates that data from the first window 410 was dropped into the second window 420 that indicates that the application of the second window 420 should be the primary and larger window shown.

Another example of an updated presentation includes preview views related to user interactions. An example preview view is a tooltip user interface element. As described herein, a drag-and-drop user action can cause a drop event message to be generated and sent that includes metadata in the payload regarding the item being dragged and dropped (such as a description of the item or a title for the item). Accordingly, the user interface generator 106 can determine a description of the item (such as a data set) from the metadata, and cause presentation of a user interface element for a drag user interaction where the user interface element can include the description that previews the item. The description can include a textual description. An example user interface element is the data set representation 232 of FIG. 2 that describes the "1086 Events" of the data set. Accordingly, the metadata can include a description such as the text "1086 Events" and/or the user interface generator 106 can determine a description of the item by retrieving data about the item and generating a description from it. The user interface generator 106 can generate the description to include a summary of the first data. Other preview data regarding the item includes icons, images, or actual data from the data set (such as several rows of a data set) that could be previewed to the user.

At block 1612, user input can be received. For example, the graphical user interface system 1300 can receive user input. The example user input includes a user making a request to the graphical user interface system 1300 to open an application in a new window. Another example user input includes a user making requests to the graphical user interface system 1300 to see an alternate view, such as an orientation view or a historical view. As shown, in response to user input at block 1612, the graphical user interface system 1300 can cause an updated presentation and loop back to block 1610, such as a new window being opened. As described herein, an external frame can be used to create open applications in a new window, such as adding an iframe with an application to the Document Object Model in a web context.

At block 1614, one or more alternate view(s) can be presented. For example, the user interface generator 106 can cause the presentation of an orientation view or a historical view. For an orientation view, the user interface generator 106 can cause presentation of a new layout of sub-windows. The presentation of the new layout can include determining, from a record, such as a record of a drag and drop interaction, a relation between a first application and a second application. An example relation between applications includes a first application providing input to a second application. In the example of FIG. 5, the data shown in the third application of the third window 540 originated from the time series application of the first window 510. The user interface generator 106 can determine respective positions of the windows according to the relation of the applications in those windows as indicated by the stored record(s). The user interface generator 106 can cause presentation of the windows at the new positions. In the example orientation view of FIG. 10, the first window 1010 is shown at a position to the left of the third window 1040 since it was determined that the first window 1010 supplied input data to the third window 1040, which can be different from the positions of the corresponding first window 510 and the third window 540 of FIG. 5. Thus, the new layout can include a first area for input windows, a second area for a primary window that received input from the input windows, and/or a third area for windows that do not fall into either the first or second areas.

In some embodiments, the user interface generator 106 can efficiently animate windows so as not to incur expensive re-rendering of windows. For example, during the presentation of the new layout for an orientation view, the user interface generator 106 can scale a window from a first size to a second size. An example scaling of a window is the scaling down of the third window 1040 of FIG. 10 as compared to the third window 540 of FIG. 5. Another example of scaling includes scaling a window up from a first size to a second size. The scaling may not cause a resize of the window. In some embodiments, the scaling can be accomplished via styling instructions and transitions, such as Cascading Style Sheets (CSS) and a CSS transition in a web context. Moreover, without actually resizing a window, the user interface generator 106 can change the size of a wrapping element to mask content to cause the effect of a window being resized.

Another example alternative view includes a historical view that enables a user to see the history of user actions with the graphical user interface system and other historical data regarding the underlying data in the graphical user interfaces. For example, the user interface generator 106 can generate a graph that presents a historical view of user interactions in the underlying data. The user interface generator 106 can generate or graph from the stored records in the interaction data storage 1312 and/or from historical data saved in memory. The user interface generator 106 can determine nodes from the stored records. In some embodiments, a node can represent a resource, a data set, an item, a user interface, a transformation, a user interaction, and/or an application. Example connections include that a first application supplied input to a second application, a second application transformed data from a first application, an application generated a new data set from an initial data set, and/or an application generated a user interface from a data set. In the drag-and-drop example, there can be a stored record for the drag-and-drop interaction, and the user interface generator 106 can determine a first node as the source of the item from the drag-and-drop and a second node as the destination for the item for the drag and drop. The user interface generator can further connect the first node to the second node according to the record, such as the drag and drop interaction record, which indicates a connection between a first application and a second application. Example historical views are described in further detail with respect to FIGS. 11 and 12.

As shown, the method 1600 can proceed in a loop after block 1614 to return to block 1602. Thus, a user can work within the graphical user interface system 1300, opening windows, closing windows, transitioning between windows, scaling windows, moving data, generating data, saving data, showing alternative views, etc., some or all of which can be tracked by the graphical user interface system 1300.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

The software instructions and/or other executable code described herein may be read from a computer readable storage medium (or mediums). The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a segment or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 17:
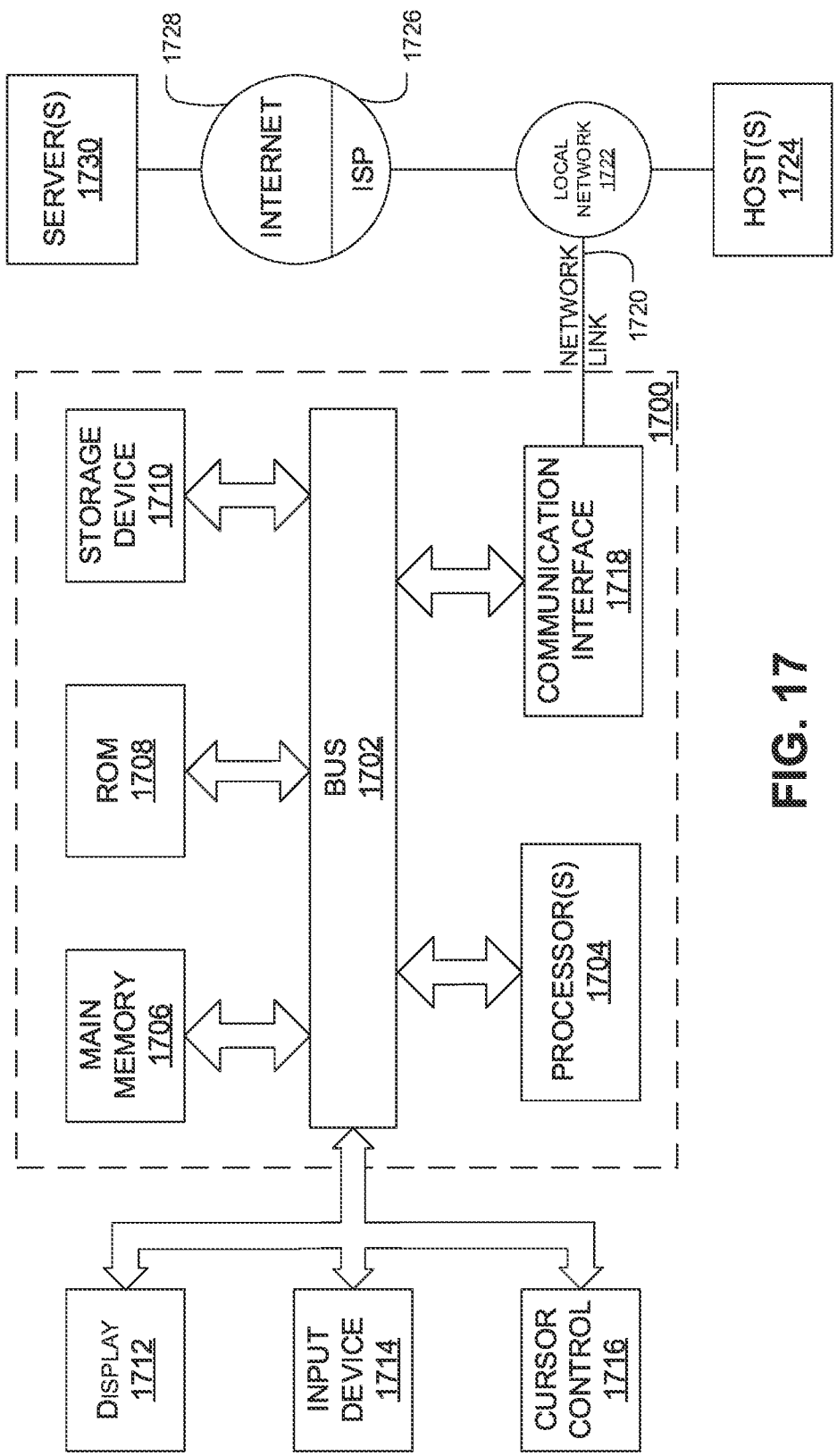
FIG. 17 is a block diagram illustrating an example graphical user interface system with which various methods and systems discussed herein may be implemented.

For example, FIG. 17 is a block diagram that illustrates a computer system 1700 upon which various embodiments may be implemented. The computer system 1700 includes a bus 1702 or other communication mechanism for communicating information, and a hardware processor, or multiple processors, 1704 coupled with bus 1702 for processing information. The hardware processor(s) 1704 may be, for example, one or more general purpose microprocessors. The graphical user interface system 1300, any of the other computing devices, modules, services, and/or user computing devices discussed herein may have some or all of the same or similar components of the computer system 1700.

The computer system 1700 also includes a main memory 1706, such as a random access memory (RAM), cache and/or other dynamic storage devices, coupled to the bus 1702 for storing information and instructions to be executed by a processor 1704. The main memory 1706 also may be used for storing temporary variables or other intermediate information during execution of instructions to be executed by a processor 1704. Such instructions, when stored in storage media accessible to the processor 1704, render the computer system 1700 into a special-purpose machine that is customized to perform the operations specified in the instructions. Such instructions, as executed by hardware processors, may implement the methods and systems described herein for generating and/or rapidly deploying user interfaces based on configuration files.

The computer system 1700 further includes a read only memory (ROM) 1708 or other static storage device coupled to bus 1702 for storing static information and instructions for processor(s) 1704. A storage device 1710, such as a magnetic disk, optical disk, or flash drive, etc., is provided and coupled to bus 1702 for storing information and instructions. The user interface generator 106 and/or the history service 108 of FIG. 13 may be stored on the main memory 1706 and/or the storage device 1710.

The computer system 1700 may be coupled via the bus 1702 to a display 1712, such as a cathode ray tube (CRT) or LCD display (or touch screen), for displaying information to a computer user. An input device 1714, including alphanumeric and other keys, is coupled to bus 1702 for communicating information and command selections to the processor 1704. Another type of input device 1714 is a touch screen. Another type of user input device is the cursor control 1716, such as a mouse, a trackball, or cursor direction keys for communicating direction information and command selections to the processor 1704 and for controlling cursor movement on the display 1712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

According to one embodiment, the techniques herein are performed by computer system 1700 in response to the processor(s) 1704 executing one or more sequences of one or more computer readable program instructions contained in the main memory 1706. Such instructions may be read into the main memory 1706 from another storage medium, such as the storage device 1710. Execution of the sequences of instructions contained in the main memory 1706 causes the processor(s) 1704 to perform the process steps described herein. In alternative embodiments, hard-wired circuitry may be used in place of or in combination with software instructions.

Various forms of computer readable storage media may be involved in carrying one or more sequences of one or more computer readable program instructions to the processor 1704 for execution. For example, the instructions may initially be carried on a magnetic disk or solid state drive of a remote computer. The remote computer can load the instructions into its dynamic memory and send the instructions over a computer network. The computer system 1700 can receive the data and appropriate circuitry can place the data on the bus 1702. The bus 1702 carries the data to the main memory 1706, from which the processor 1704 retrieves and executes the instructions. The instructions received by the main memory 1706 may optionally be stored on the storage device 1710 either before or after execution by the processor 1704.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1710. Volatile media includes dynamic memory, such as main memory 1706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1702. Transmission media can also take the form of acoustic or light waves, such as those generated during radio-wave and infra-red data communications.

The computer system 1700 also includes a communication interface 1718 coupled to the bus 1702. The communication interface 1718 provides a two-way data communication coupling to a network link 1720 that is connected to a local network 1722. For example, the communication interface 1718 may be an integrated services digital network (ISDN) card, cable modem, satellite modem, or a modem to provide a data communication connection to a corresponding type of telephone line. As another example, the communication interface 1718 may be a local area network (LAN) card to provide a data communication connection to a compatible LAN (or WAN component to communicated with a WAN). Wireless links may also be implemented. In any such implementation, the communication interface 1718 sends and receives electrical, electromagnetic or optical signals that carry digital data streams representing various types of information.

The network link 1720 typically provides data communication through one or more networks to other data devices. For example, the network link 1720 may provide a connection through the local network 1722 to a host computer 1724 or to data equipment operated by an Internet Service Provider (ISP) 1726. The ISP 1726 in turn provides data communication services through the world wide packet data communication network now commonly referred to as the "Internet" 1728. The local network 1722 and Internet 1728 both use electrical, electromagnetic or optical signals that carry digital data streams. The signals through the various networks and the signals on the network link 1720 and through communication interface 1718, which carry the digital data to and from the computer system 1700, are example forms of transmission media.

A network, such as the network 1360 of FIG. 13, may comprise, but is not limited to, one or more local area networks, wide area network, wireless local area network, wireless wide area network, the Internet, or any combination thereof.

The computer system 1700 can send messages and receive data, including program code, through the network(s), network link 1720 and communication interface 1718. In the Internet example, a server 1730 might transmit a requested code for an application program through the Internet 1728, the ISP 1726, the local network 1722 and the communication interface 1718.

The received code may be executed by the processor(s) 1704 as it is received, and/or stored in the storage device 1710, or other non-volatile storage for later execution.

In some embodiments, the graphical user interface system 1300 and/or the computer system 1700 may operate in a distributed computing environment including several computer systems that are interconnected using one or more computer networks. The graphical user interface system 1300 and/or the computer system 1700 could also operate within a computing environment having a fewer or greater number of devices than are illustrated in FIG. 13 and/or FIG. 17. Thus, the depiction of graphical user interface system 1300 and/or the computer system 1700 in FIG. 13 and/or FIG. 17 should be taken as illustrative and not limiting to the present disclosure. For example, the graphical user interface system 1300 and/or the computer system 1700 could implement various Web services components and/or peer-to-peer network configurations to implement at least a portion of the processes described herein. For example, multiple servers and/or processes may process and/or analyze items and/or present a user interface in a distributed manner, as described herein.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

It will be appreciated that while the present disclosure typically discusses user interfaces in the context of a plant as examples, the systems and methods described herein regarding generating user interfaces and other aspects may be agnostic to the particular background context. For example, the techniques for generating user interfaces described herein may be used in a transportation context, a cyber security context, or other contexts. Further, while drag and drop is used as an example herein, the windowing techniques described herein may be used without drag and drop or with other user interactions with respect to the data flow between applications in different windows. Moreover, while the present disclosure discusses some user interfaces in the context of a data management system, such as a data pipeline system, the systems and methods described herein regarding generating user interfaces and other aspects may be agnostic to the backend data system(s).

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
  causing presentation, in a main window, of a first application in a first sub-window and a second application in a second sub-window, wherein presentation of the first sub-window and the second sub-window are within the main window;
  receiving a drag and drop input indicating movement of a data resource from the first application in the first sub-window to the second application in the second sub-window, wherein the drag and drop input interaction causes a communication of the data resource from the first application to the second application;
  in response to receiving the drag and drop input indicating the movement of the data resource from the first application to the second application, causing an updated presentation, in the main window, of the second application in the second sub-window as larger than the first application in the first sub-window;
storing a record of the drag and drop input that indicates the communication of the data resource from the first application to the second application;
generating a graph, wherein the graph represents a history of one or more user interactions associated with the main window, wherein generating the graph comprises:
  determining, from the record of the drag and drop input, a first node corresponding to the first application and a second node corresponding to the second application; and
  connecting the first node to the second node according to the record of the drag and drop input that indicates the communication of the data resource from the first application and to the second application; and
causing presentation, based on the record of the drag and drop input, of a visual representation of the graph that includes the first node as visually connected to the second node, wherein the first node as visually connected to the second node represents a user interaction between the first application and the second application and the communication of the data resource from the first application to the second application,
wherein the computer-implemented method is performed by one or more computer hardware processors.

2. The computer-implemented method of claim 1, wherein prior to receiving the drag and drop input, presentation of the first application in the first sub-window is larger than the second application in the second sub-window.

3. The computer-implemented method of claim 1, further comprising:
  storing a plurality of records, wherein each record of the plurality of records indicates a user interaction within the main window.

4. The computer-implemented method of claim 3, wherein generating the graph further comprises:
  determining a plurality of nodes, wherein each node from the plurality of nodes corresponds to a record from the plurality of records, and wherein the graph comprises the plurality of nodes.

5. The computer-implemented method of claim 1, wherein generating the graph further comprises:
  determining a third node that represents at least one of a data resource, a data set, an item, a user interface, a transformation, a user interaction, or a third application; and
  connecting the third node to the second node, wherein the visual representation of the graph further includes the third node as visually connected to the second node.

6. The computer-implemented method of claim 1, wherein the graph comprises a directed graph.

7. A system comprising:
  a non-transitory computer storage medium configured to at least store computer-executable instructions; and
  one or more computer hardware processors in communication with the non-transitory computer storage medium, the one or more computer hardware processors configured to execute the computer-executable instructions to at least:
    cause presentation, in a main window, of a first application in a first sub-window and a second application in a second sub-window, wherein presentation of the first sub-window and the second sub-window are within the main window;
    receive a drag and drop input indicating movement of a data resource from the first application in the first sub-window to the second application in the second sub-window, wherein the drag and drop input causes a communication of the data resource from the first application to the second application;
    in response to receiving the drag and drop input indicating the movement of the data resource from the first application to the second application, causing an updated presentation, in the main window, of the second application in the second sub-window as larger than the first application in the first sub-window;
    store a record of the drag and drop input;
    receive a request to present a historical view that indicates the communication of the data resource from the first application to the second application;
    generate a graph, wherein the graph represents a history of one or more user interactions associated with the main window, wherein generating the graph comprises:
      determining, from the record of the drag and drop input, a first node corresponding to the first application and a second node corresponding to the second application; and
      connecting the first node to the second node according to the record of the drag and drop input that indicates the communication of the data resource from the first application to the second application; and
    cause presentation, based on the record of the drag and drop input, of the historical view that includes a visual representation of the graph that includes the first node as visually connected to the second node, wherein the first node as visually connected to the second node represents a user interaction between the first application and the second application and the communication of the data resource from the first application to the second application.

8. The system of claim 7, wherein the one or more computer hardware processors are further configured to execute additional computer-executable instructions to at least:
  cause presentation, in the main window, of a new layout of the first sub-window and the second sub-window, wherein causing presentation of the new layout further comprises:
    determining a first position of the first application in the first sub-window and a second position of the second application in the second sub-window; and
    causing presentation, in the main window, of the first sub-window at the first position and the second sub-window at the second position.

9. The system of claim 7, wherein the one or more computer hardware processors are further configured to execute additional computer-executable instructions to at least:
  store a plurality of records, wherein each record of the plurality of records indicates a user interaction within the main window.

10. The system of claim 9, wherein generating the graph further comprises:
  determining a plurality of nodes, wherein each node from the plurality of nodes corresponds to a record from the plurality of records, and wherein the graph comprises the plurality of nodes.

11. The system of claim 7, wherein the one or more computer hardware processors are further configured to execute additional computer-executable instructions to at least:
- determine a third node that represents at least one of a data resource, a data set, an item, a user interface, a transformation, a user interaction, or a third application; and
- connect the third node to the second node, wherein the visual representation of the graph further includes the third node as visually connected to the second node.

12. The system of claim 7, wherein receiving the drag and drop input further comprises receiving a first message from the first application, wherein the first message comprises a data resource identifier associated with the drag and drop input interaction, and wherein the one or more computer hardware processors are further configured to execute additional computer-executable instructions to at least:
- transmit a second message to the second application that causes the second application in the second sub-window to retrieve first data indicated by the data resource identifier.

13. The system of claim 7, wherein the visual representation of (i) the first node in the graph further includes a first icon that corresponds to a first type of the first node and (ii) the second node in the graph further includes a second icon that corresponds to a second type of the second node.

14. A system comprising:
- a non-transitory computer storage medium configured to at least store computer-executable instructions; and
- one or more computer hardware processors in communication with the non-transitory computer storage medium, the one or more computer hardware processors configured to execute the computer-executable instructions to at least:
  - cause presentation, in a main window, of a first application in a first sub-window and a second application in a second sub-window, wherein presentation of the first sub-window and the second sub-window are within the main window;
  - receive a drag and drop input indicating movement of a data resource from the first application in the first sub-window to the second application in the second sub-window, wherein the drag and drop input causes a communication of the data resource from the first application to the second application;
  - in response to receiving the drag and drop input indicating the movement of the data resource from the first application to the second application, causing an updated presentation, in the main window, of the second application in the second sub-window as larger than the first application in the first sub-window;
  - store a record of the drag and drop input that indicates the communication of the data resource from the first application to the second application;
  - generate a graph, wherein the graph represents a history of one or more user interactions associated with the main window, wherein generating the graph comprises:
    - determining, from the record of the drag and drop input, a first node corresponding to the first application and a second node corresponding to the second application; and
    - connecting the first node to the second node according to the record of the drag and drop input that indicates the communication of the data resource from the first application to the second application; and
  - cause presentation, based on the record of the drag and drop input, of a visual representation of the graph that includes the first node as visually connected to the second node, wherein the first node as visually connected to the second node represents a user interaction between the first application and the second application and the communication of the data resource from the first application to the second application.

15. The system of claim 14, wherein the one or more computer hardware processors are further configured to execute additional computer-executable instructions to at least:
- store a plurality of records, wherein each record of the plurality of records indicates a user interaction within the main window.

16. The system of claim 15, wherein generating the graph further comprises:
- determining a plurality of nodes, wherein each node from the plurality of nodes corresponds to a record from the plurality of records, and wherein the graph comprises the plurality of nodes.

17. The system of claim 14, wherein the one or more computer hardware processors are further configured to execute additional computer-executable instructions to at least:
- determine a third node that represents at least one of a data resource, a data set, an item, a user interface, a transformation, a user interaction, or a third application; and
- connect the third node to the second node, wherein the visual representation of the graph further includes the third node as visually connected to the second node.

18. The system of claim 14, wherein receiving the drag and drop input further comprises receiving a first message from the first application, wherein the first message comprises a data resource identifier associated with the drag and drop input, and wherein the one or more computer hardware processors are further configured to execute additional computer-executable instructions to at least:
- transmit a second message to the second application that causes the second application in the second sub-window to retrieve first data indicated by the data resource identifier.

19. The system of claim 14, wherein the visual representation of (i) the first node in the graph further includes a first icon that corresponds to a first type of the first node and (ii) the second node in the graph further includes a second icon that corresponds to a second type of the second node.

20. The system of claim 14, wherein the graph comprises a directed graph, wherein each node in the directed graph is connected with another node in the directed graph by an edge, wherein each edge in the directed graph has a direction, and wherein each direction of a respective edge indicates a flow of data.

* * * * *

UNITED STATES PATENT AND TRADEMARK OFFICE
CERTIFICATE OF CORRECTION

| | |
|---|---|
| PATENT NO. | : 11,733,856 B2 |
| APPLICATION NO. | : 17/099548 |
| DATED | : August 22, 2023 |
| INVENTOR(S) | : Adam Storr et al. |

It is certified that error appears in the above-identified patent and that said Letters Patent is hereby corrected as shown below:

In the Specification

In Column 26, Line 13, after "indicate" insert --.--.

In the Claims

In Column 36, Claim 1, Lines 61-62, after "input" delete "interaction".

In Column 39, Claim 12, Line 15, delete "input interaction," and insert --input,--.

Signed and Sealed this
Fifth Day of December, 2023

*Katherine Kelly Vidal*

Katherine Kelly Vidal
*Director of the United States Patent and Trademark Office*